(12) United States Patent
Savoy et al.

(10) Patent No.: US 7,100,260 B2
(45) Date of Patent: Sep. 5, 2006

(54) PROGRAMMABLE APPARATUS AND METHOD FOR BODY PANEL AND CLINCH NUT ATTACHMENT

(75) Inventors: Mark A. Savoy, Metamora, MI (US); Phillip J. Morgan, Commerce Township, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 264 days.

(21) Appl. No.: 10/641,580

(22) Filed: Aug. 15, 2003

(65) Prior Publication Data

US 2004/0123708 A1    Jul. 1, 2004

Related U.S. Application Data

(63) Continuation-in-part of application No. 10/329,893, filed on Dec. 26, 2002.

(51) Int. Cl.
*B23P 11/00* (2006.01)

(52) U.S. Cl. .............. 29/432.1; 29/243.53; 29/432; 29/524.1; 29/703; 29/798; 29/818; 72/334; 72/407; 72/447

(58) Field of Classification Search ........... 29/243.5, 29/243.53, 432, 432.1, 509, 524.1, 701, 703, 29/798, 818; 72/334, 407, 447, 453.1
See application file for complete search history.

(56) References Cited

U.S. PATENT DOCUMENTS

| | | | |
|---|---|---|---|
| 2,187,647 A | 1/1940 | Double et al. | |
| 2,661,599 A | 12/1953 | Folmer | |
| 2,983,256 A | 5/1961 | Seeloff | |
| 3,089,360 A | 5/1963 | Steward | |
| 3,405,436 A | 8/1968 | Koett | |
| 3,457,840 A | 7/1969 | Grimes | |
| 3,485,141 A | 12/1969 | Ott et al. | |
| 3,718,965 A | 3/1973 | Steward | |
| 3,810,290 A | 5/1974 | Grube | |
| 3,811,171 A | 5/1974 | Grube | |
| 3,938,798 A | 2/1976 | Solie et al. | |
| 3,942,235 A | 3/1976 | Goodsmith et al. | |
| 3,998,444 A | 12/1976 | Stockwell | |
| 4,203,187 A | 5/1980 | Grube | |
| 4,348,796 A | 9/1982 | Smallegan | |
| 4,396,186 A | 8/1983 | Solie et al. | |
| 4,438,971 A | 3/1984 | Zaydel | |
| 4,500,079 A | 2/1985 | Morghen | |
| 4,531,355 A | 7/1985 | Numakura | |
| 4,690,599 A | 9/1987 | Shinjo | |
| 4,692,983 A * | 9/1987 | Kristola et al. ............... 29/432 |

(Continued)

*Primary Examiner*—Derris H. Banks
*Assistant Examiner*—Hung C Le
(74) *Attorney, Agent, or Firm*—VanOphem & VanOphem, P.C.

(57) ABSTRACT

A method and apparatus for forming attachment pads on a panel for attachment of a clinch nut thereto. The panel is formed between a forming die and a fixed anvil, which occupies a predefined net reference position. A face plate simultaneously "finds" the panel and is mechanically locked into position using a novel force applying device. The face plate maintains the location of the surface metal around the forming die, thereby forming a raised pad at the predefined net reference position. The novel force applying device includes self-contained piston modules positioned in tandem. Each module includes a housing having a void and a piston mounted within the void. The piston includes a driven and drive surfaces, wherein fluid pressure acts against the driven surface to drive the piston in an advanced direction such that the drive surface of the piston abuts another piston for cumulative effect.

30 Claims, 28 Drawing Sheets

U.S. PATENT DOCUMENTS

| | | |
|---|---|---|
| 4,743,001 A | 5/1988 | Craft |
| 4,760,633 A | 8/1988 | Dacey, Jr. |
| 4,884,431 A | 12/1989 | Dacey, Jr. |
| 5,133,206 A | 7/1992 | Jackson |
| 5,208,974 A | 5/1993 | Swadon et al. |
| 5,440,912 A | 8/1995 | Copeman |
| 5,713,564 A | 2/1998 | Schindler |
| 5,915,679 A | 6/1999 | Kohlert |
| 6,293,534 B1 | 9/2001 | Leban |
| D448,659 S | 10/2001 | Pamer et al. |
| 6,314,862 B1 | 11/2001 | Retterer |
| 6,523,819 B1 | 2/2003 | Leban |

\* cited by examiner

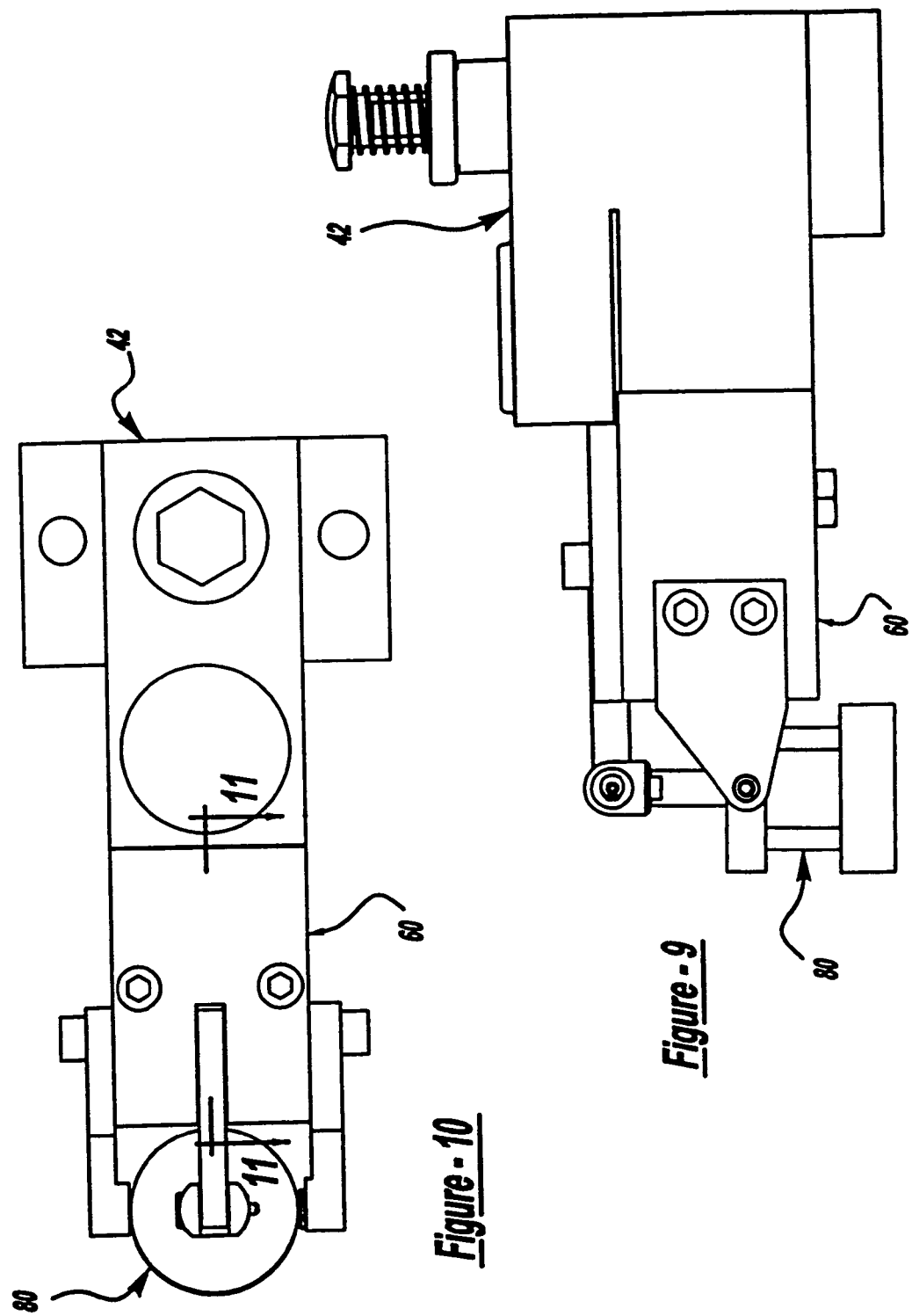

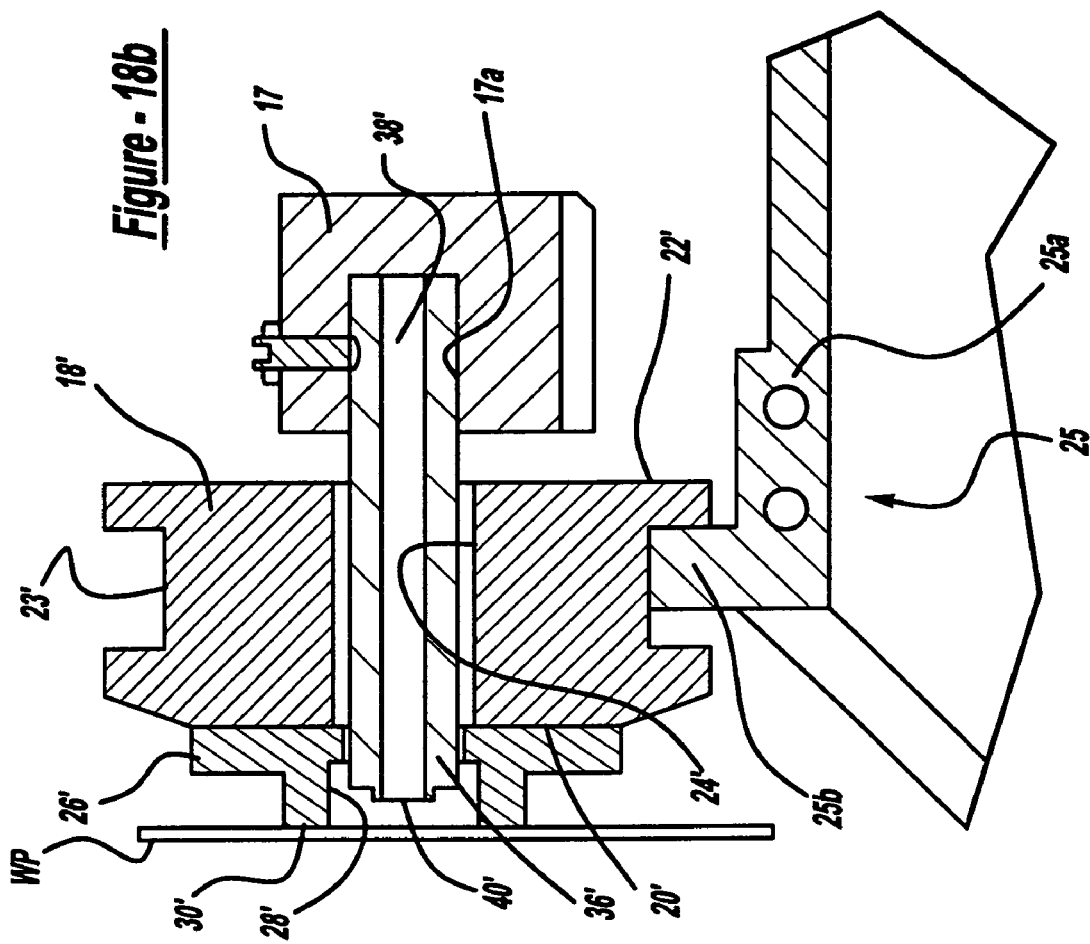
*Figure - 18b*
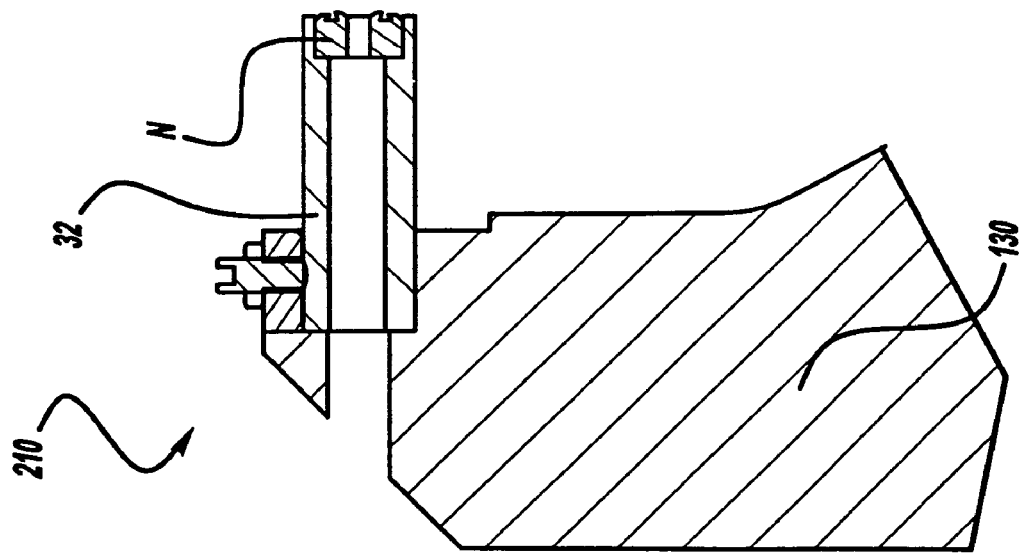

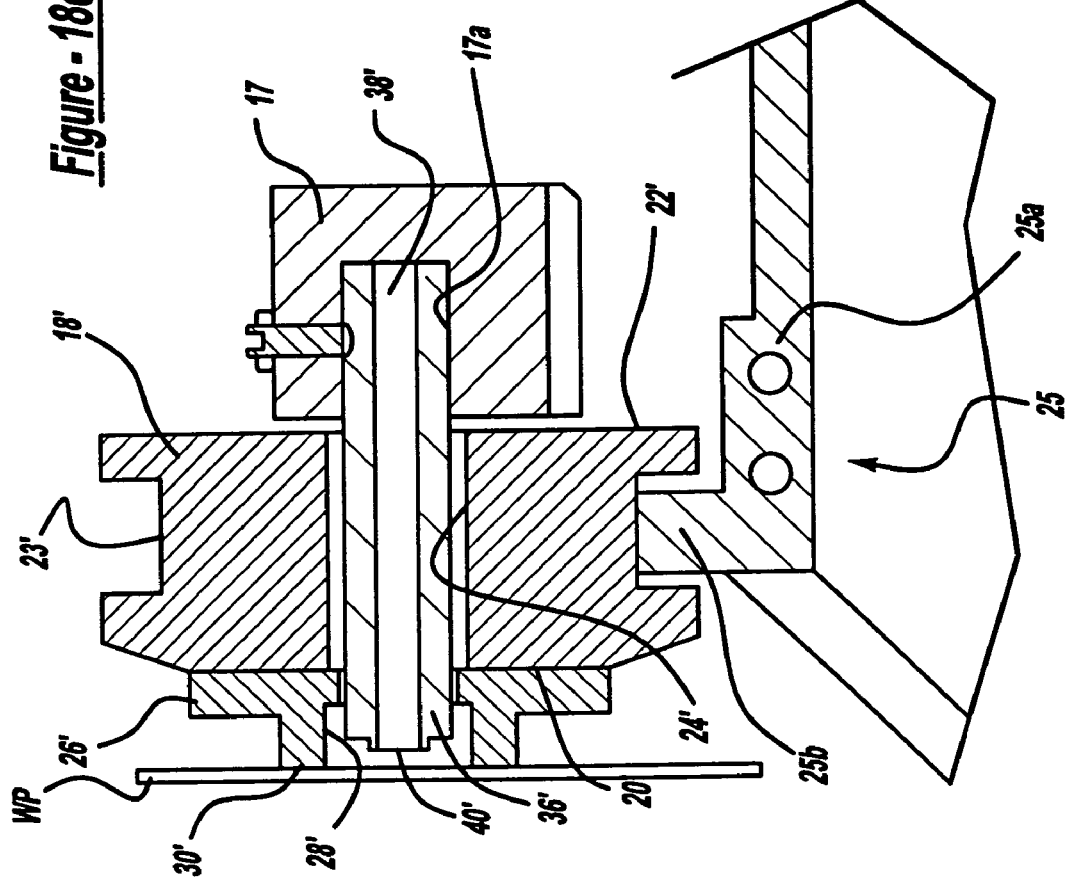
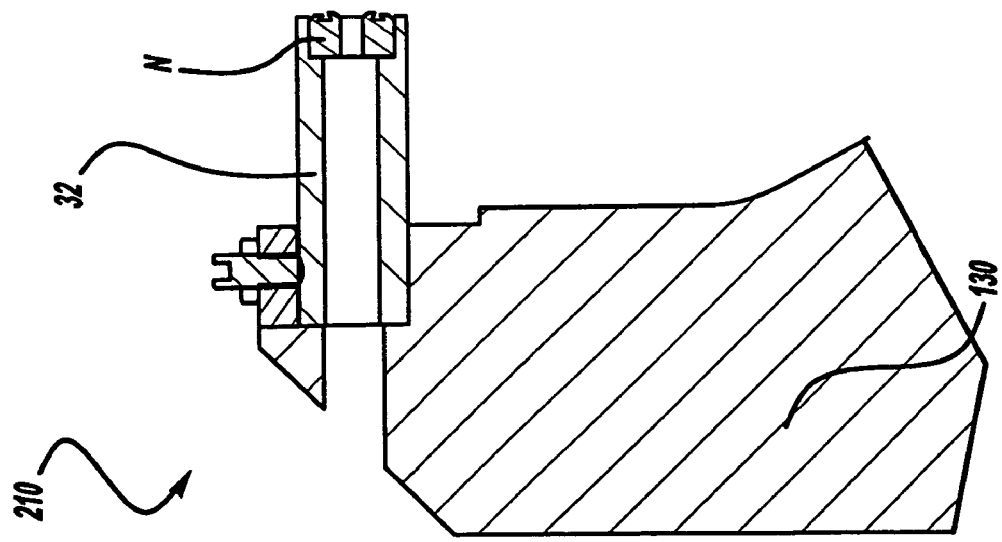
Figure - 18c

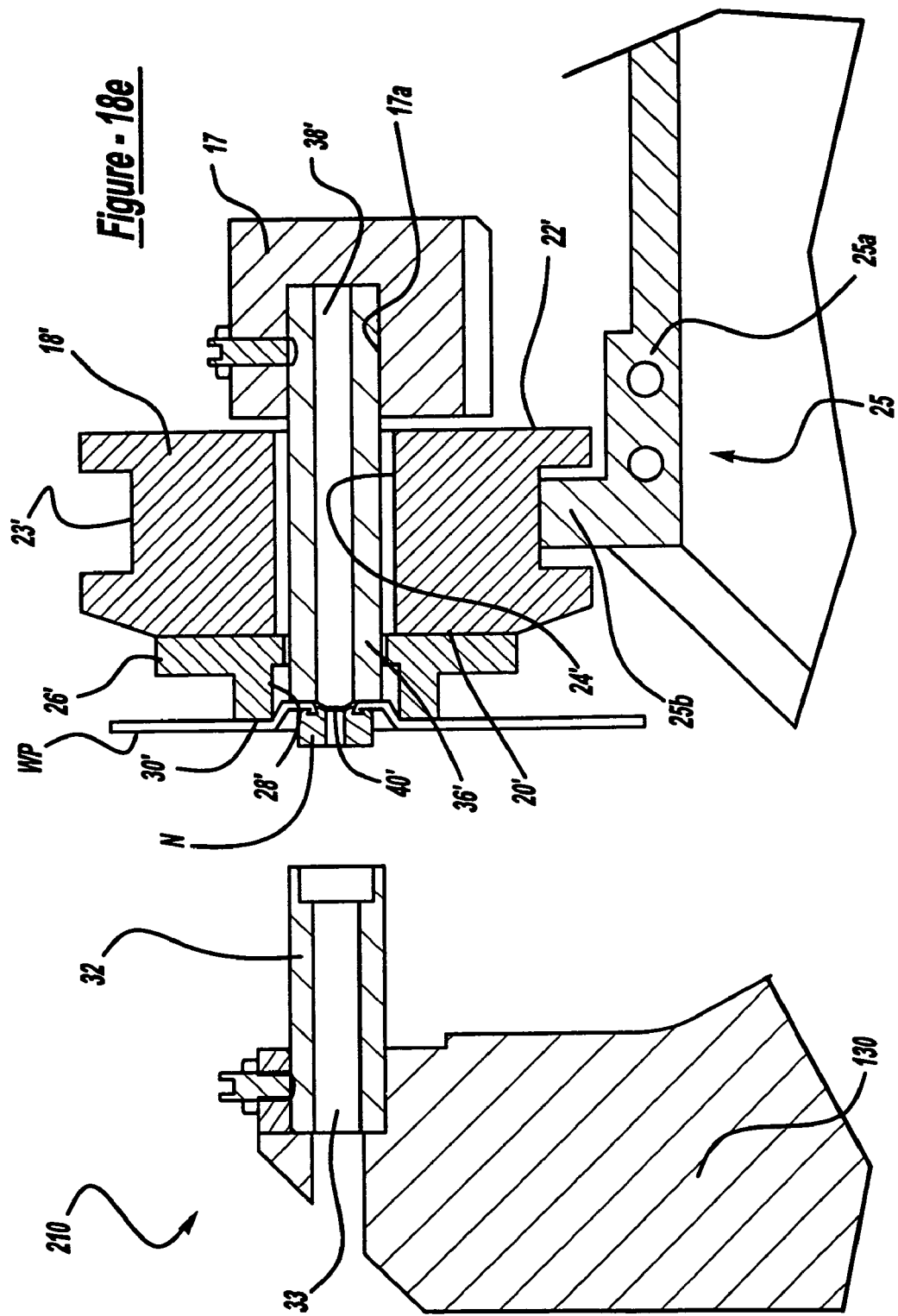

PROGRAMMABLE APPARATUS AND METHOD FOR BODY PANEL AND CLINCH NUT ATTACHMENT

CROSS-REFERENCES TO RELATED APPLICATIONS

The present application is a continuation-in-part of pending U.S. application Ser. No. 10/329,893 to Mark A. Savoy, filed on Dec. 26, 2002 and assigned to the assignee hereof.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to the precise attachment of a first member to a second member, and provides a method of and apparatus for reforming the second member by a variable magnitude depending on the actual position of the second member relative to a predefined net reference position. The invention relates, in particular, to the precise attachment of an outer body panel member of an automotive vehicle to an imprecisely located element of an inner body panel structure. The invention also particularly relates to the precise attachment of a fastener to a body panel member and a novel force applying device.

2. Description of the Related Art

In the automotive industry, the assembly of vehicles involves the attachment of outer body panels to inner body panels or body structures. It is therefore important that the inner body panel attachment positions be precisely located with respect to predetermined three-dimensional coordinates so that variations thereof are not translated through the attachment of the outer body panels so as to be visible to the customer.

W. S. Zaydel, et al., U.S. Pat. No. 4,438,971, describes a method of and apparatus for attaching, at a precise location, a plastic automotive body panel to a relatively imprecisely located element of an inner body panel structure. According to the teachings of this patent, plastic-filled metal attachment blocks or pads are welded at selected locations to the inner body panel structure. The inner body panel structure is then positioned within a locating and machining fixture and each of the plastic-filled attachment blocks is milled to a precise position, the distance between the inner body panel structure and the milled face of the plastic-filled attachment blocks varying with the position of the inner body panel structure. The plastic outer body panel member is then attached to the milled face of the plastic-filled attachment block, after drilling a hole in the plastic-filled attachment block to receive a threaded fastener or a fastener attached to the inside of the plastic outer body panel member. By this method and apparatus, each such plastic outer body panel member is mounted in a precisely determined and in precise surface alignment with each adjacent plastic panel.

The method and apparatus of the aforesaid U.S. Pat. No. 4,438,971 does lead to precision in the positioning of plastic outer body panels to a relatively imprecisely positioned automotive inner body panel structure, but it requires the attachment of the plastic-filled attachment blocks to the inner body panel structure which adds to the material and processing costs. Additionally, the subsequent milling of the plastic-filled attachment blocks generates scrap which is a mixture of a metal and the plastic filler material which, for the disposition of such scrap in an environmentally acceptable manner, involves additional expense and, in any case, the milling of the plastic-filled attachment blocks generates dust corresponding, mainly, to the composition of the plastic filler. This is also objectionable on environmental and workplace health and safety grounds, unless strict precautions are followed in performing the milling and drilling of the plastic-filled attachment blocks.

It is also known in the prior art that a relatively imprecisely located automotive inner body panel element can be built up to provide for the attachment thereto of an outer body panel element at a more precisely determined location by attaching one or more metal shims to the surface of the inner body panel element to which the outer body element is to be attached, the number of such shims to be attached based on the original position of the inner body panel element. However, this is a time-consuming and expensive procedure, and the attachment of such shims adds to the weight of the vehicle, an undesirable feature especially since it detracts from fuel economy.

Dacey, Jr., U.S. Pat. Nos. 4,760,633 and 4,884,431 disclose a method and apparatus for body panel attachment which reforms a portion of an inner panel member to a precise location. This method and apparatus employs an anvil that is moved into a known position defining the desired precise location of the inner panel attachment surface. Floating support members engage and thereby locate the inner panel, and are then locked in a fixed position.

A hydraulic ram is actuated and moves a pad forming member mounted thereon under force against the inner panel to deform a portion of the inner panel between the floating support members into engagement with the anvil. This results in an attachment pad being formed in the inner panel whose surface is located at the precise location desired for attachment to another member, such as an outer body panel. While the pad forming member is still in engagement with the anvil, a punching operation is performed to form an aperture in the pad. A punch is moved by a separate hydraulic cylinder through the pad to form the aperture.

While Dacey, Jr. does provide an alternate method for precisely assembling an outer body panel to an imprecisely located inner body panel, both patents rely on hydraulic actuation of the ram and punch. Hydraulic equipment generally suffers from the disadvantages of significantly increased cost and maintenance requirements, slow operation, and auxiliary cooling requirements. Additionally, hydraulic devices include a pressurized fluid, typically oil, that occasionally leaks as a result of long term use within the environment of an assembly operation. Hydraulic leaks are messy, carcinogenic, environmentally unacceptable, and present a serious fire hazard. Finally, the heating and consequent expansion of the hydraulic fluid must be taken into consideration for precise control of variable speed and/or variable stroke hydraulic ram devices.

Jackson, U.S. Pat. No. 5,133,206 discloses a method and apparatus for forming a portion of a panel member to a predetermined reference position. The apparatus includes a sensing device that locates the actual position of a panel member. Next, an extendible and retractable rod positions a holding means including a first and second pair of arms at the actual located position of the panel member established by the sensing device. A drive means is then actuated to move the first and second pair of arms into engagement with the panel member to hold adjacent sides of the portion of the panel member to be reformed to the predetermined reference position.

After locating and holding the panel member, a forming means including a fourth pair of arms is moved to urge a forming member into the panel member to reform the portion of the panel member to the predetermined reference position. An aperture is optionally pierced in the reformed portion of the panel member by sequentially urging a piercing pin mounted on the end of a third pair of arms into the reformed portion of the panel member.

The invention disclosed by Jackson also includes the steps of camming the first and second pair of arms between the first and second positions, as well as camming the third and fourth pair of arms from a first position spaced from the panel member to a second position such that the forming member and piercing pin engage the panel member. The step of camming the holding means from the first to the second positions is initiated before the step of camming the forming means is initiated so as to bring the holding means into engagement with the panel member before the forming means engages the panel member.

The Jackson invention identifies the same problem addressed by Dacey, Jr., and teaches an apparatus adapted to provide the same solution taught by Dacey, Jr. Although Jackson alleges an improved apparatus, the only support provided for such allegation is that the apparatus employs a single actuation device for holding the inner body panel in a fixed position. The Jackson invention, however, remains problematic for the following reasons.

The apparatus taught by Jackson is excessively complex and thus unnecessarily expensive and subject to failure. More specifically, Jackson incorporates numerous moving components including a positioning means having an extendible and retractable rod, a hydraulic or pneumatic drive means responsive to the output of a sensor device, and four pair of adjustable arms each having a cam device wherein each moving component gives rise to an additional mode of failure.

Furthermore, Jackson discloses a complex sensor device adapted to locate the panel member and transmit a corresponding output signal to the drive means that is controlled thereby. This sensor device is a critical feature of the disclosure whereby any imprecision thereof is proportionally translated to the attachment pad formed on the inner body panel, and potentially gives rise to a visibly misaligned outer body panel. As the effectiveness of the Jackson apparatus is predicated on the sensor device maintaining a high degree of precision over numerous cycles, the device becomes increasingly expensive. Finally, Jackson does not disclose a device for analyzing the precision of the sensor device for purposes of error proofing, whereby loss of precision thereof will likely result in numerous defectively assembled automobiles before it can identified and addressed.

Copeman, U.S. Pat. No. 5,440,912 discloses an apparatus adapted to form a workpiece to a net position and pierce a hole in the workpiece. The apparatus generally includes an inner and an outer slide assembly. The outer slide assembly includes a hydraulic form cylinder slidably mounted to a base, the form cylinder has a form punch mounted thereon via a pair of outer slide rails. The inner slide assembly includes a hydraulic pierce cylinder, including a form back-up and is coupled to a form cylinder rod end via a cylinder mounting block extension.

The workpiece is positioned between the form back-up of the inner slide assembly and the form punch of the outer slide assembly. Actuation of the form cylinder compels the cylinder mounting block extension along with the entire inner slide assembly toward the workpiece until the form back-up contacts the workpiece. A slave cylinder connected to the inner slide assembly is fillable through a one way valve so that when the form back-up of the inner slide assembly contacts the workpiece, the slave cylinder locks the form back-up in place.

The form cylinder continues to push the form cylinder rod end thereby moving a form punch and an anvil, connected via the outer slide rails, toward the workpiece. The form cylinder extends a predetermined amount to emboss the workpiece to a net position. After the workpiece has been embossed, a pierce cylinder of the inner slide assembly actuates a punch to pierce a hole in the workpiece. The use of hydraulic cylinders by Copeman present the same disadvantages for this device as set forth with regard to the device of Dacey, Jr.

The inventions of Dacey, Jr., Jackson and Copeman disclose similar devices. Jackson claims to require fewer steps than Dacey, Jr., and Copeman claims to be more compact, however, the devices accomplish the same objective in much the same way. One of the common features of Dacey, Jr., Jackson and Copeman includes an actuation device having constant velocity and stroke. More sophisticated programmable punching and forming motions including variable velocity and stroke are advantageous for a number of reasons described in detail hereinafter.

Variable velocity punching and forming devices reduce cycle time by varying the speed of the ram over the cycle with a rapid ram advance and retraction combined with slower speeds as the work piece is approached as well as during actual punching or forming. Variable velocity allows for a broader working range in that a single actuation device can accommodate a variety of different size dies and/or punches, and can form and/or punch a variety of different materials and material configurations.

Variable stroke forming devices permit positive depth control of a formed feature. Variable stroke punching devices are capable of making a variety of different sized and shaped holes with a single cutting tool. This is accomplished by, for example, providing a cutting tool having an initial cutting surface and a secondary cutting surface a predetermined axial distance therefrom, wherein the effective diameter of the secondary engagement surface is necessarily larger than that of the initial engagement surface. A variable stroke device incorporating such a cutting tool can form a small hole using a short stroke such that the secondary cutting surface does not contact the material to be punched. The same device can also form a larger hole by using a longer stroke such that both the initial and secondary cutting surfaces pass through the material to be punched.

Finally, an apparatus having a programmable punching motion in combination with a linear transducer provides automatic error proofing of the process to ensure that a hole has been punched. As is well known in the art, the current signature provided by the linear transducer is representative of punch/metal resistance, as the resistance encountered by the punch greatly increases during engagement with the metal panel, a current spike is generated. Accordingly, a current spike indicates a successful punching operation, and conversely the absence of a current spike indicates the desired punching operation was not performed (i.e. the punch broke and did not engage the panel).

Various apparatus have been disclosed for applying force to lock work support devices that are incorporated in larger overall devices such as welders, clamps, and metal forming devices. Such apparatus are typically not expandable to suit various force requirements, and yet are very complex and, thus, unnecessarily expensive and prone to an abundance of failure modes.

For example, U.S. Pat. No. 2,661,599 to Folmer teaches use of a pneumatically operated welder head. The Folmer welder head includes a unitary thin-walled cylinder that is closed at one end with a fitting and closed at an opposite end with a bushing. The cylinder includes a bore with an enlarged portion, which is defined by a step or shoulder in the cylinder wall. A sleeve is entrapped within the enlarged portion of the bore between the shoulder and the bushing, for dividing the cylinder bore into two compartments. Two pistons are provided, one disposed in each of the two compartments, and are connected together by a rod extending through a partition wall of the sleeve for moving the pistons together in unison. The rod includes an axial passage extending therethrough and a radial passage that intersects with the axial passage. The radial passage is closed off by the sleeve when both pistons are fully retracted. Unfortunately, the Folmer cylinder is not compact and not readily adaptable for larger or smaller welder head applications. Moreover, the cylinder requires deep internal boring to achieve the stepped, enlarged bore. Similarly, the sleeve also requires relatively deep internal boring thereof. Such boring operations need to be precise in order for smooth piston movement within the bore and such boring is hard to control and, therefore, time consuming and costly. Similarly complex devices are described in the following U.S. patents: U.S. Pat. No. 3,457,840 to Grimes; U.S. Pat. No. 3,485,141 to Ott et al.; and U.S. Pat. No. 6,314,862 to Retterer.

U.S. Pat. No. 2,983,256 to Seeloff teaches use of a multiple piston elliptical fluid cylinder for use in driving other devices. Seeloff discloses a cylinder that is assembled from a plurality of wall elements and spacer elements. The cylinder is completed by using tie rods extending through the wall and spacer elements and fastening to front and rear heads on opposite ends of the cylinder. The wall and spacer elements are centrally apertured to accommodate a piston rod therethrough. The front and rear heads and the wall and spacer elements define fluid chambers therebetween, which include pistons disposed therein and fixed to the piston rod using snap rings. A multitude of O-ring seals are required between the piston rod and pistons or spacer elements, and between the pistons and wall elements. Like the Follmer patent, the Seeloff invention is not compact and not readily adaptable to a variety of different applications. Similarly, the Seeloff invention requires an over-abundance of parts, most of which require precision machining and assembly, and many of which are seals that represent fluid leak failure modes.

From the above, it can be appreciated that the prior art methods and apparatuses for precisely positioning and attaching a first member to an imprecisely located second member by forming a portion of the second member to a predetermined net reference position are not fully optimized. Moreover, the force applying devices of the prior art are also not optimized for reduced complexity and cost and increased reliability and performance. Therefore, what is needed is a forming, punching, and clinch nut attaching apparatus having variable velocity and stroke, which does not rely on hydraulic actuation, that is simple, reliable and inexpensive as well as environmentally acceptable. What is also needed is a force applying device that is more compact and reliable, less costly, and readily adaptable for use with a wide range of devices having various force requirements.

BRIEF SUMMARY OF THE INVENTION

According to the preferred embodiment of the present invention, there is provided a method of and apparatus for programmably reforming a work piece by a variable amount to present its surface or one or more selected portions thereof at a precise position for the attachment of a complementary member thereto. The method and apparatus are particularly adapted for reforming a portion of an inner automotive body panel to receive an outer automotive body panel at a location that is more precisely determined than the original location of such inner automotive body panel.

A single such apparatus may be configured to form one or more attachment pads at specific locations on the work piece, such that the external surface of each attachment pad is precisely located at a predefined net reference position regardless of the initial position of the work piece within an acceptable tolerance range, and thereafter optionally punch a hole or slot in each attachment pad. The predefined net reference position for each specific location is maintained at a fixed position from vehicle to vehicle. However, a person skilled in the art recognizes that this fixed position may vary from one location to another due to the variable contours of the complementary members being attached to the work piece.

The apparatus of the present invention includes a punch disposed within a hollow portion of a fixed anvil that is in turn circumscribed by a face plate passage such that the punch, the hollow portion of the fixed anvil, and the face plate passage are coaxially aligned. The punch has a primary cutting surface at an end portion thereof and a secondary cutting surface located a predetermined axial distance therefrom, the contour of the secondary cutting surface encompassing that of the primary cutting surface. The fixed anvil has a pad contacting surface that provides a fixed net stop to locate and support the external surface of the attachment pad during the formation thereof. The face plate includes a support surface and a passage therethrough. The punch is translatable through the hollow portion of the fixed anvil, in a direction toward or away from the engaged portion of the work piece. The face plate is biased in a direction away from the fixed anvil to locate against the inner body panel and be slidably retracted by contact with the inner body panel while the fixed anvil is moved to the predefined net reference position for a specific location.

The face plate is biased in a fully extended position such that the support surface protrudes axially beyond the pad contacting surface of the fixed anvil. The pad contacting surface is initially positioned apart from the work piece by an amount sufficient to ensure that the support surface of the face plate does not prematurely engage the work piece. Thereafter, the apparatus of the present invention is moved along the axis of the fixed anvil toward the work piece in a direction generally perpendicular thereto. As the pad contacting surface approaches the predefined net reference position for a specific location, the support surface of the fully extended face plate comes into contact with the work piece. Additional advancement of the pad contacting surface toward the predefined net reference position overcomes the fully extended bias of the face plate, which effectively retracts the support surface of the face plate relative to the pad contacting surface of the fixed anvil.

The apparatus of the present invention "finds" the work piece by positioning all three axes of the pad contacting surface of the fixed anvil at the predefined net reference position for the specific location, such that the axial distance between the support surface and the pad contacting surface is representative of the difference between the original position of the work piece and the precisely located predefined net reference position therefor. After positioning the fixed anvil at the predefined net reference position for a specific work piece location, the face plate is pneumatically locked into position such that the support surface of the face plate remains in contact with the work piece. The pneumatically actuated locking mechanism advantageously replaces conventional hydraulically actuated devices thereby avoiding the associated disadvantages described hereinabove.

The apparatus of the present invention further includes a form ram that is preferably driven by a ball screw device and a reversible electric servomotor such that the velocity, acceleration and stroke length of the ram are programmable. Additionally, electric actuation of the ram avoids the disadvantages associated with similar hydraulic actuation described hereinabove. A forming die with a hollow central portion is mounted to the form ram whereby actuation of the form ram forms the work piece between the forming die and the pad contacting surface of the fixed anvil. The support surface of the face plate maintains the location of the surface metal around the forming die which results in the formation of a raised pad.

Accordingly, as long as the work piece is initially within an acceptable tolerance range, it will be provided with an attachment pad having an external surface precisely located at the predefined net reference position. The depth of each such pad varies according to the difference between the predefined net reference position for a specific location and the initial position of the work piece at the specific location. Each pad formed according to the method of the present invention is ready for the attachment of a complementary member thereto without any further processing or final hand fitting being required to establish its final attachment location.

The apparatus of the present invention is optionally adapted to provide a hole or contoured slot in the formed pad to receive a fastener and thereby facilitate attachment of a complementary member thereto. For this purpose, a second ball screw device and servo-motor similar to that disclosed hereinabove is provided to actuate the punch. While the forming die is still engaged with and thereby supporting an internal surface of the attachment pad, the punch advances through the work piece and into the hollow central portion of the forming die. A hole may be formed by limiting the stroke length of the punch such that only the primary cutting surface engages the work piece, whereas extending the stroke length so that both the primary and secondary cutting surfaces pass through the work piece provides a contoured slot.

Finally, as is well known in the art, the programmable punching motion disclosed herein provides automatic error proofing to ensure that indeed a hole was punched. A current signature generated by the programmable punch is representative of resistance, and as the resistance encountered by the punch greatly increases during engagement with the work piece, a current spike is produced. Accordingly, a current spike indicates a successful punching operation, and conversely the absence of a current spike indicates the desired punching operation was not properly performed (i.e. the punch broke and did not engage the work piece).

According to another embodiment, the present invention also includes an apparatus for attaching a component to the attachment pad. Specifically, a forming die is provided for mounting a clinch nut thereto, whereby the forming die cooperates with the fixed anvil, with the workpiece therebetween, to form the attachment pad and clinch the clinch nut to the attachment pad simultaneously or nearly simultaneously.

According to yet another embodiment of the present invention, there is provided a force applying having a plurality of self-contained piston modules that are positioned in tandem. The plurality of self-contained piston modules include housings that have voids therein, and include pistons mounted within the voids of the housings. The pistons include driven surfaces and drive surfaces substantially opposite of the driven surfaces, wherein the pistons are adapted to receive fluid pressure against the driven surfaces to drive the pistons in an advanced direction, such that the drive surfaces of the pistons abut other driven surfaces of other pistons of the plurality of self-contained piston modules.

Therefore, it is an object of the present invention to provide a method and apparatus for precisely positioning and attaching a first member to an imprecisely located second member, wherein the apparatus includes a punching and forming device having variable velocity and stroke.

It is another object to provide a method and apparatus for precisely positioning and attaching a first member to an imprecisely located second member, wherein the apparatus is not hydraulically actuated and therefore not subject to the associated disadvantages disclosed hereinabove.

It is still another object to provide a simple, reliable and inexpensive method and apparatus for precisely positioning and attaching a first member to an imprecisely located second member.

It is yet another object to provide a method and apparatus for forming a portion of a panel member to a predefined net reference position having a reduced cycle time.

It is a further object to provide an apparatus for forming a portion of a panel member to a predefined net reference position and punching a hole in the formed portion of the panel member, wherein the apparatus has a broad working range in that a single actuation device can accommodate different size forming dies and punches, and can form or punch a variety of different materials and material configurations.

It is still a further object to provide an apparatus capable of making a variety of different sized and shaped holes with a single cutting tool.

It is yet a further object to provide a method and apparatus for error proofing a punching operation whereby it will be made readily apparent if and when the punching operation is unsuccessful.

It is still yet a further object to provide an apparatus for pneumatically actuating and maintaining the internal locking mechanism of a work support device.

It is another object to eliminate the expense associated with hydraulics in an automotive work environment.

It is another object to eliminate environmental and safety hazards associated with hydraulic oil in an automotive work environment.

It is another object to provide a method and apparatus for net attaching components such as tail lamps, bumpers, fascias, head lamps, fuel filler doors, etc.

It is a further object of the present invention to provide a method and apparatus for precisely positioning and attaching a member to another component, wherein the apparatus includes a forming and clinching device having variable velocity and stroke.

It is another object to provide a method and apparatus for precisely positioning and attaching a member to another component, wherein the apparatus is not hydraulically actuated and therefore not subject to the associated disadvantages disclosed hereinabove.

It is still another object to provide a simple, reliable and inexpensive method and apparatus for precisely positioning and attaching a member to a fastener.

These objects and other features, aspects, and advantages of this invention will be more apparent after a reading of the following detailed description, appended claims, and accompanying drawings.

BRIEF DESCRIPTION OF THE SEVERAL VIEWS OF THE DRAWINGS

FIG. 8b is an isometric view of a toggle lock device of the pneumatic work support actuator shown in FIG. 8a;

FIG. 8c is an isometric view of a housing of the pneumatic work support actuator shown in FIG. 8a;

FIG. 9 is a side view of the work support and pneumatic work support actuator shown in FIG. 8a;

FIG. 10 is a plan view of the work support and pneumatic work support actuator shown in FIG. 8a;

FIG. 18b is a view similar to FIG. 18a showing a subsequent step in the alternative method of the present invention;

FIG. 18c is a view similar to FIGS. 18a–18b showing a subsequent step in the alternative method of the present invention;

FIG. 18e is a view similar to FIGS. 18a–18d showing a subsequent step in the alternative method of the present invention;

FIG. 21 is a side view of the work support and force applying device of FIG. 20a;

FIG. 22 is a top view of the work support and force applying device shown in FIG. 20;

FIG. 24 is a plan view of one of the pistons of FIG. 23a.

DETAILED DESCRIPTION OF THE PREFERRED EMBODIMENT

Figure 1:
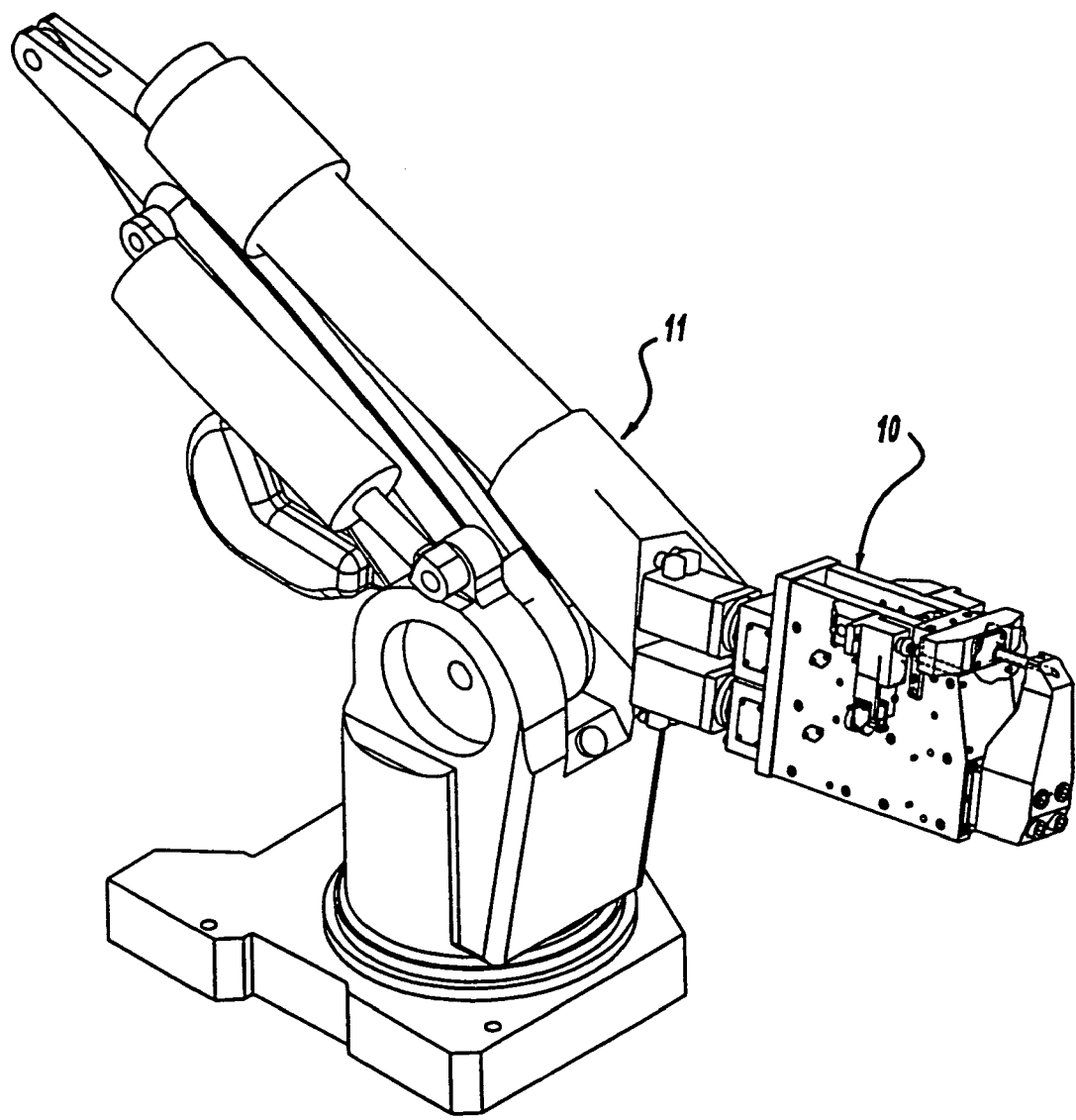
FIG. 1 is a side view of a preferred embodiment of the apparatus according to the present invention shown attached to a robot.
Figure 2:
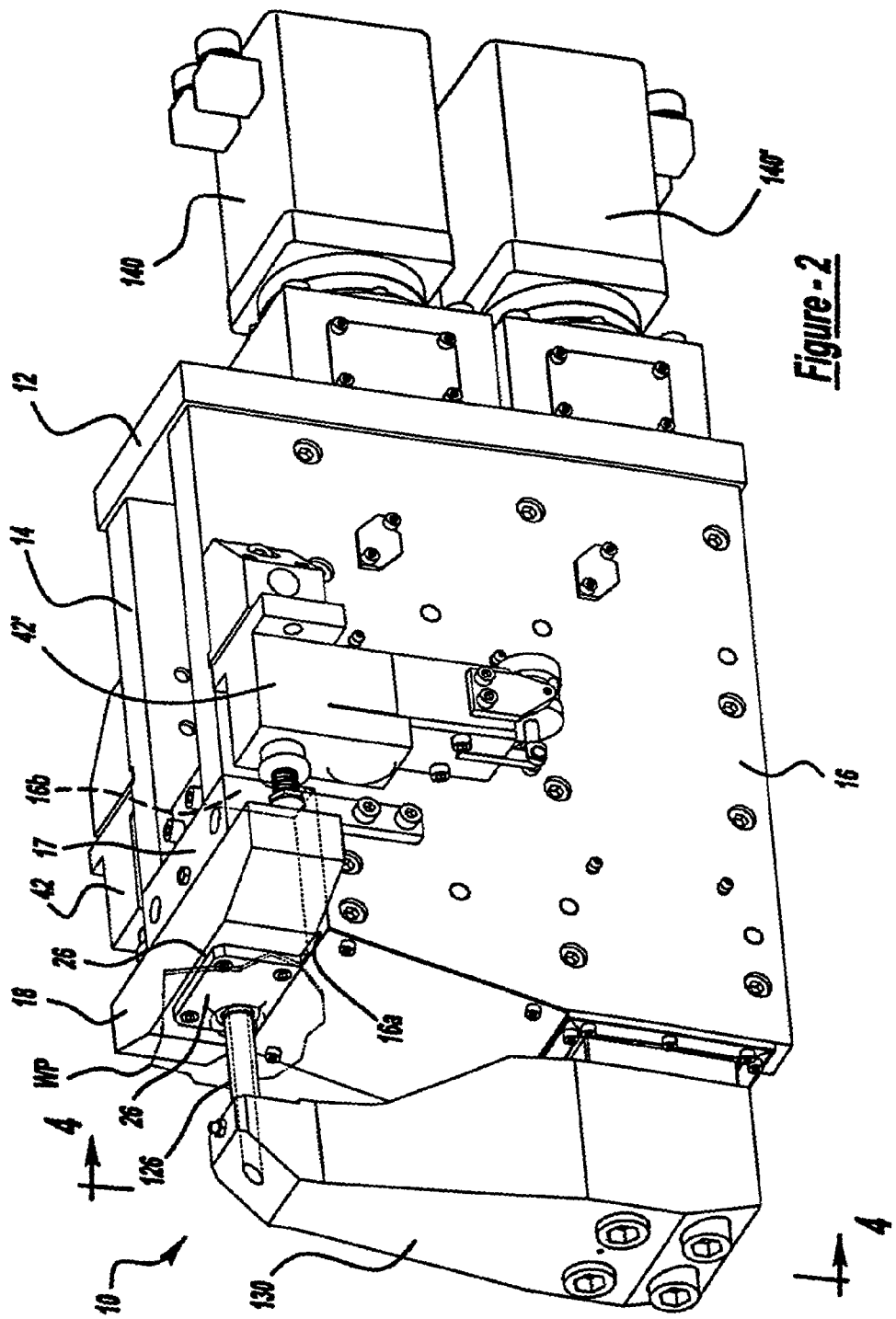
FIG. 2 is an isometric view of the apparatus of FIG. 1.
Figure 7:
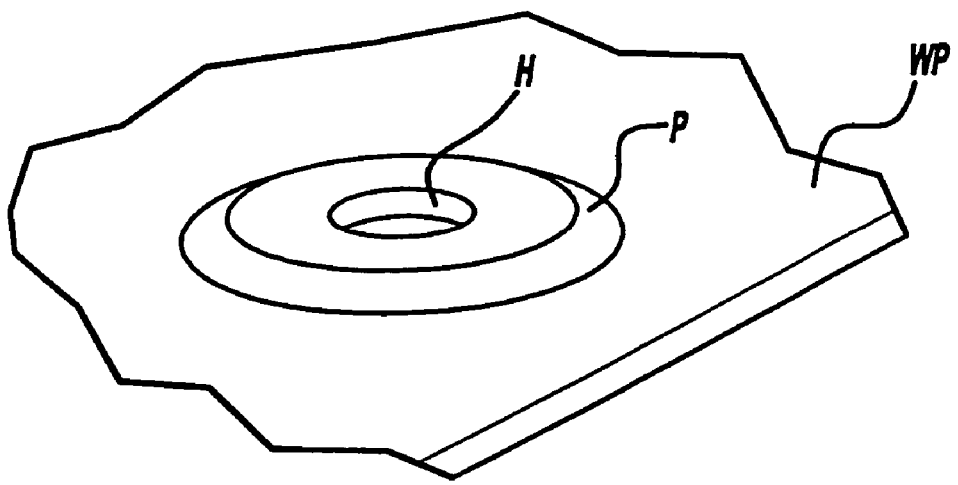
FIG. 7 is a partial isometric view showing an inner body panel formed and punched by the apparatus of FIG. 2 according to the method of FIGS. 6a–6e.

Referring now in detail to the Figures, there is shown in FIGS. 1 and 2 a net locating device in the form of a pad forming device 10 that is constructed in accordance with the present invention. According to the preferred embodiment, one or more programmable robots 11 move the pad forming device 10 into and out of working engagement with a work piece WP, and precisely position the pad forming device 10 relative to specific locations on the work piece WP. The pad forming device 10 is adapted to form an attachment pad P (shown in FIG. 7) at one or more specific locations on the work piece WP, such that the external surface of each attachment pad P is precisely located at a predefined net reference position independently defined for each location, and thereafter punch either a hole H (shown in FIG. 7) or slot (not shown) in the attachment pad P. As long as the work piece WP is within an acceptable tolerance range, it is provided with an attachment pad having an external surface precisely located at the predefined net reference position, and a complementary member is attachable thereto without any further processing or adjustments.

In the context of the following detailed description of the preferred embodiment, the work piece WP should be considered to represent an inner automotive body panel, however it should be appreciated that the work piece WP is intended to encompass other structural elements in other environments as well. Furthermore, although the preferred embodiment disclosed herein refers to the net attachment of an outer automotive body panel, the invention is equally adapted for the net attachment of other components such as tail lamps, bumpers, fascias, head lamps, fuel filler doors, etc. Finally, relative terms such as front, rear, top, bottom, etc. apply to the pad forming device 10 as viewed in FIG. 2, wherein a die block 130 defines the front, and servo-motors 140, 140' define the rear.

Figure 3:
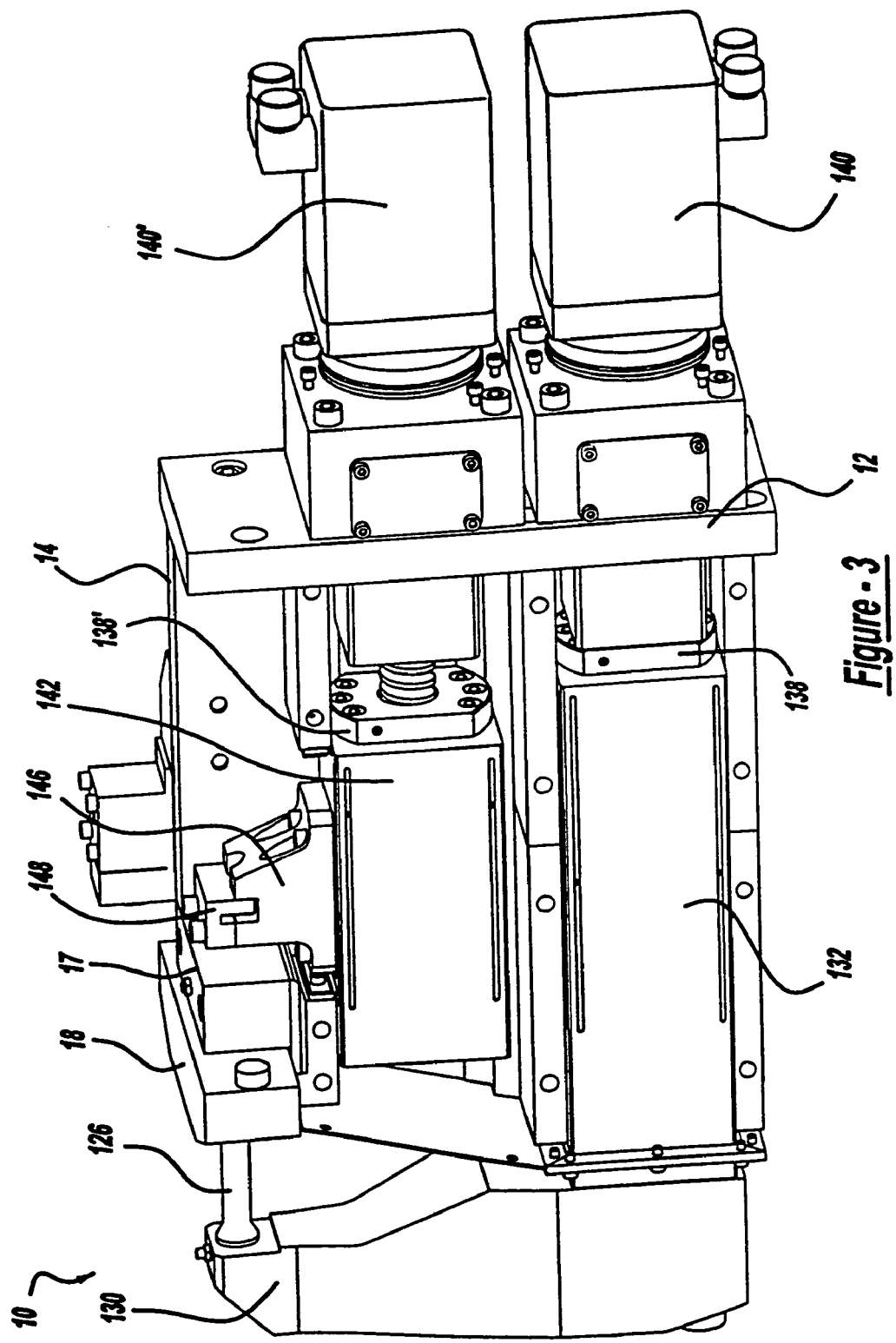
FIG. 3 is a cutaway side view of the apparatus of FIG. 2.
Figure 4:
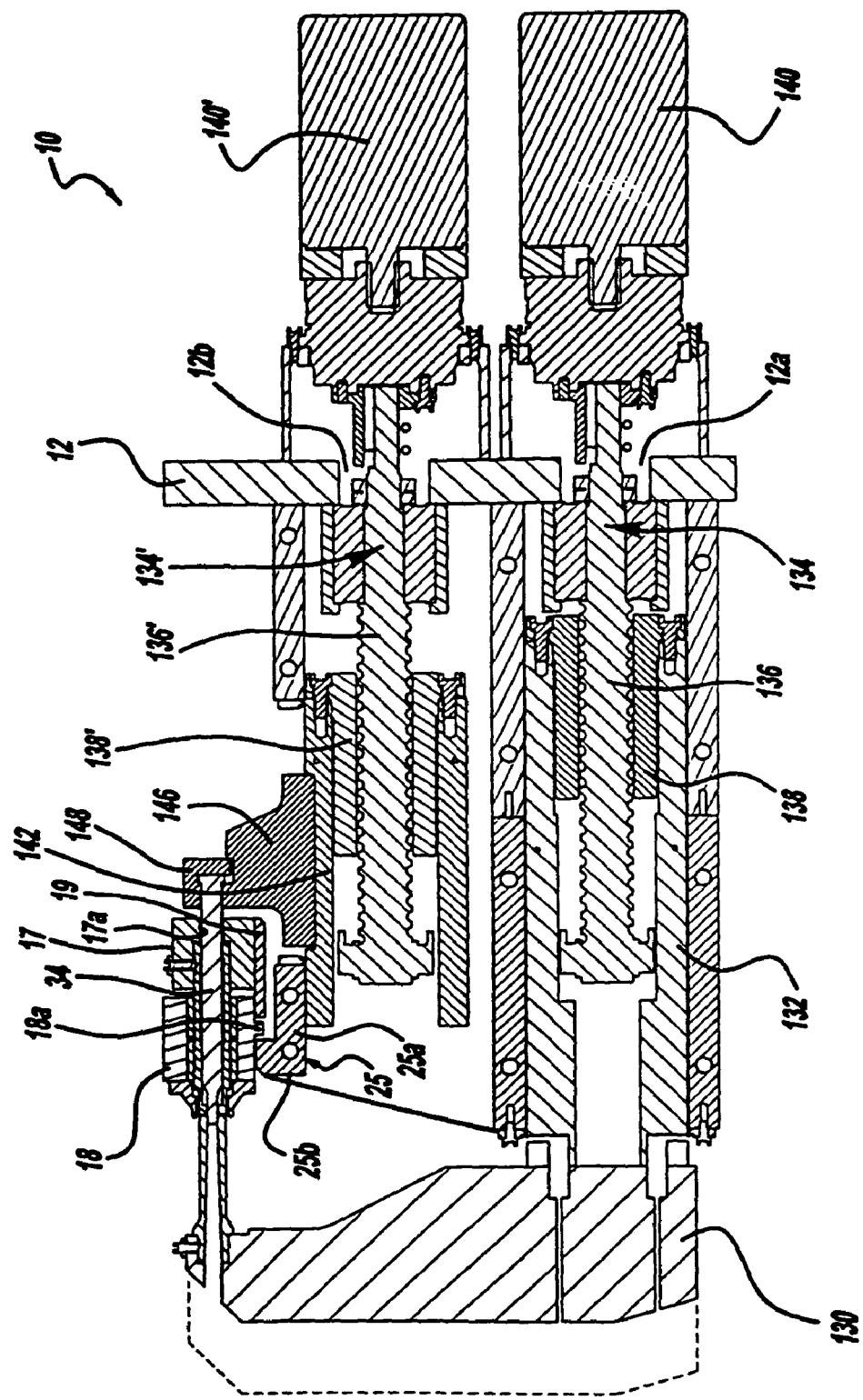
FIG. 4 is a section taken along line 4—4 of FIG. 2.

As shown in FIGS. 2–4, the pad forming device 10 includes a generally rectangular motor plate 12 having an aperture 12a disposed below an aperture 12b. The servo-motors 140, 140' are respectively aligned with the apertures 12a, 12b, and thereafter mounted to the motor plate 12 as will be explained more fully hereinafter. The pad forming device 10 also includes spaced apart generally parallel side plates 14, 16 that are attached to the motor plate 12 opposite the servo-motors 140, 140', and extend therefrom in a forward direction. The side plates 14, 16 respectively have recessed portions 14a (not shown), 16a defining shoulders 14b (not shown), 16b that are generally parallel to the motor plate 12. It should be appreciated that the side plates 14 and 16 are generally identical and while the recessed portion 14a and the shoulder 14b are not identified in the figures, they are similar to the recessed portion 16a and the shoulder 16b, respectively.

A retainer block 17, having a passage 17a extending therethrough in a fore/aft direction, mounts to the side plates 14, 16 such that the retainer block 17 is supported by shoulders 14b, 16b in a fore/aft direction, and is rigidly attached to the recessed portions 14a, 16a in an up/down direction. A spacer 19 adapted to provide for up/down adjustment of the retainer block 17 is disposed between the retainer block 17 and the recessed portions 14a, 16a, and extends in a forward direction beyond the retainer block 17. As is well known in the art, the spacer 19 is initially oversized in the up/down direction, and correspondingly the retainer block 17 is initially at the upper end of adjustment, thereafter the spacer 19 is ground by an amount necessary to lower the retainer block 17 to an aligned up/down position therefor.

Figure 5:
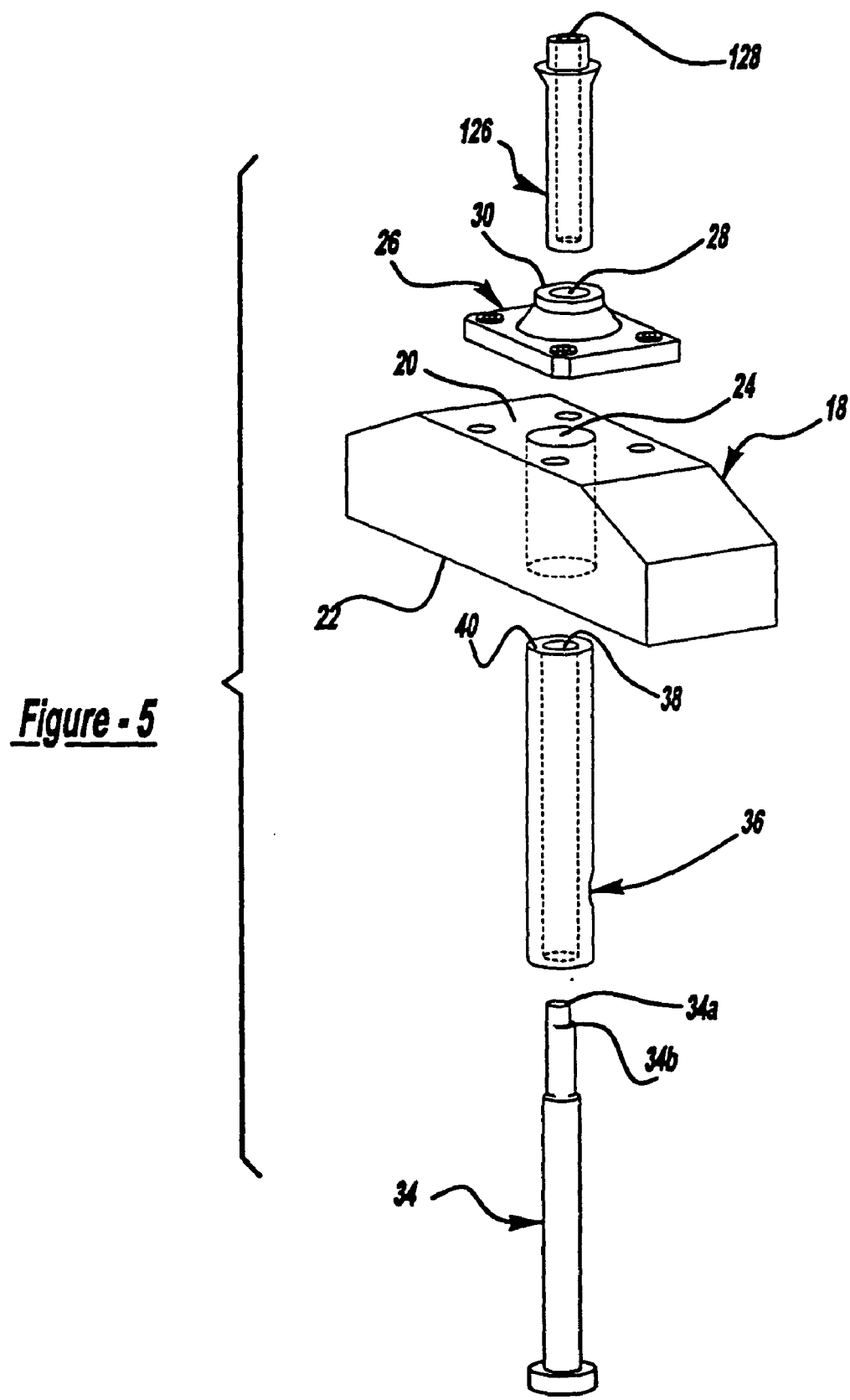
FIG. 5 is an exploded view showing details of the forming and clinching components of the apparatus of FIG. 2.

An L-shaped spacer 25 having a leg portion 25a and a foot portion 25b is disposed between the side plates 14, 16 and attached thereto such that the leg portion 25a is located below the recessed portions 14a, 16a and the foot portion 25b extends above the recessed portions 14a, 16a of the side plates 14, 16. Referring now to FIGS. 4 and 5, a slide block 18, having a front surface 20, a rear surface 22, and a passage 24 therethrough, is positioned in front of the retainer block 17 such that the passage 17a is aligned with the passage 24. The slide block 18 is adapted to translate in a fore/aft direction, is piloted about a fixed anvil 36 extending through the passage 24, and is engaged by an uppermost surface of the foot portion 25b which is configured to guide the slide block 18 and prevent rotation thereof. The up/down position of the slide block 18 may be adjusted in a manner similar to that of the retainer block 17 disclosed hereinabove, which specifically involves grinding the foot portion 25b of the L-shaped spacer 25 by an amount necessary to lower the slide block 18 to an aligned up/down position therefor. The slide block 18 includes a protrusion 18a extending therefrom in a downward direction adapted to limit the range of motion by engaging the foot portion 25b of the L-shaped spacer 25 at a forward end of travel and the spacer 19 at a rearward end of travel.

A face plate 26 having a support surface 30 and a passage 28 therethrough is mounted to the front surface 20 of the slide block 18 such that the passage 28 of the face plate 26 and the passage 24 of the slide block 18 are aligned. The fixed anvil 36 is disposed within the passage 17a of the retainer block 17 and rigidly attached thereto such that the fixed anvil 36 extends through the passage 24 of the slide block 18 and into the passage 28 of the face plate 26 terminating therein with a pad contacting surface 40. The pad contacting surface 40 of the fixed anvil 36 supports an external portion of the attachment pad P (shown in FIG. 7) during the formation thereof, and is therefore subjected to the resultant force generated during impact. It should be appreciated that the motor plate 12, the side plates 14, 16 and the retainer block 17 are configured to absorb such force acting on the pad contacting surface 40 of the fixed anvil 36 in a rearward direction. A punch 34 having a primary cutting surface 34a and a secondary cutting surface 34b is adapted to translate in a fore/aft direction through a hollow portion 38 of the fixed anvil 36, the passage 17a of the retainer block 17, the passage 24 of the slide block 18, and the passage 28 of the face plate 26.

Referring to FIGS. 6a–6e, the slide block 18 is biased in a fully extended position as will be described in detail hereinafter. Accordingly, the support surface 30 of the face plate 26 protrudes axially beyond the pad contacting surface 40 of the fixed anvil 36 by an amount equivalent to the maximum allowable pad depth for a particular application, and the L-shaped spacer 25 is engaged by the protrusion 18a. The programmable robot 11 and associated programmable motion controls rapidly move the pad forming device 10 (shown in FIG. 1) into position with respect to the work piece WP resulting in the fixed anvil 36 being positioned in the vicinity of the work piece WP but at a known distance therefrom. The programmable motion control device then moves the pad forming device 10 into final position by moving the device along the axis of the fixed anvil 36 in a direction generally perpendicular to the work piece WP such that the X, Y, and Z axes of the pad contacting surface 40 of the fixed anvil 36 are precisely positioned relative to the X, Y, and Z axes of a predefined net reference position for a specific location on the work piece WP where work is to be performed.

Figure 6A:
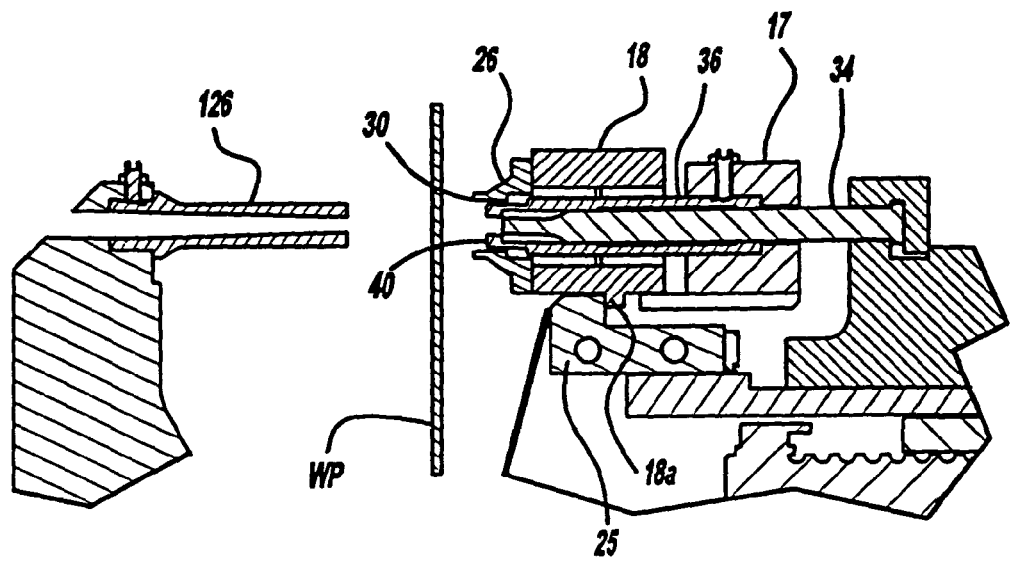
FIG. 6a is a fragmentary schematic view showing a step in the method of the present invention using the apparatus of FIG. 2.
Figure 6B:
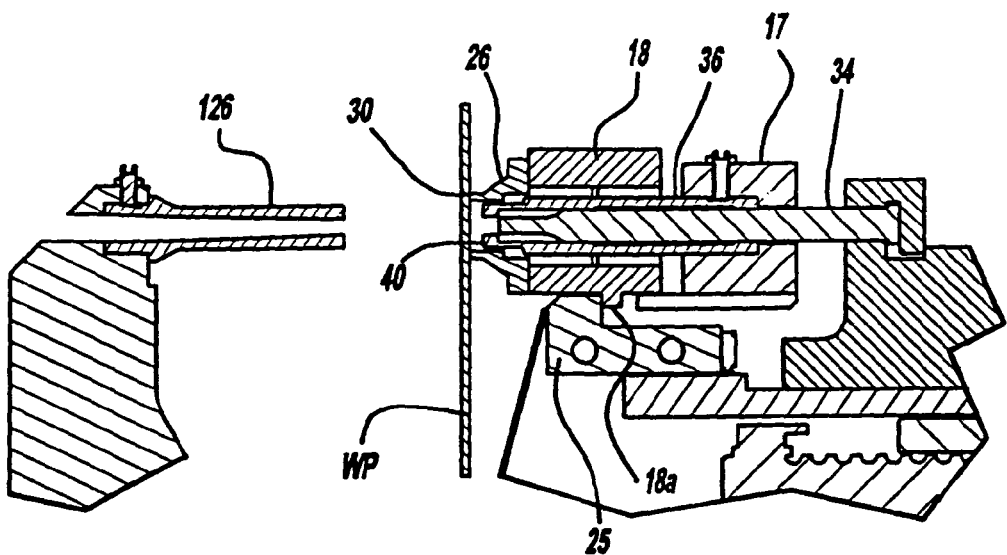
FIG. 6b is a view similar to FIG. 6a showing a subsequent step in the method of the present invention.

As seen in FIG. 6a, the pad contacting surface 40 is initially aligned with the predefined reference position and positioned apart from the work piece WP by an amount sufficient to ensure that support surface 30 of the face plate 26 does not prematurely engage the work piece WP. Thereafter, the programmable robot 11 moves the pad forming device 10 (shown in FIG. 1) along the axis of the fixed anvil 36, toward the work piece WP in a direction generally perpendicular thereto, in order to bring the X, Y, and Z axes of the pad contacting surface 40 into alignment with the X, Y, and Z axes of the predefined net reference position. As the pad contacting surface 40 approaches the work piece WP, the fully extended support surface 30 of the face plate 26 comes into contact with the work piece WP (shown in FIG. 6b). Additional advancement of the pad contacting surface 40 toward the work piece WP overcomes the fully extended bias of the slide block 18, which effectively retracts the support surface 30 of the face plate 26 relative to the pad contacting surface 40 of the fixed anvil 36 until the fixed anvil 36 reaches the predefined net reference position.

Figure 6C:
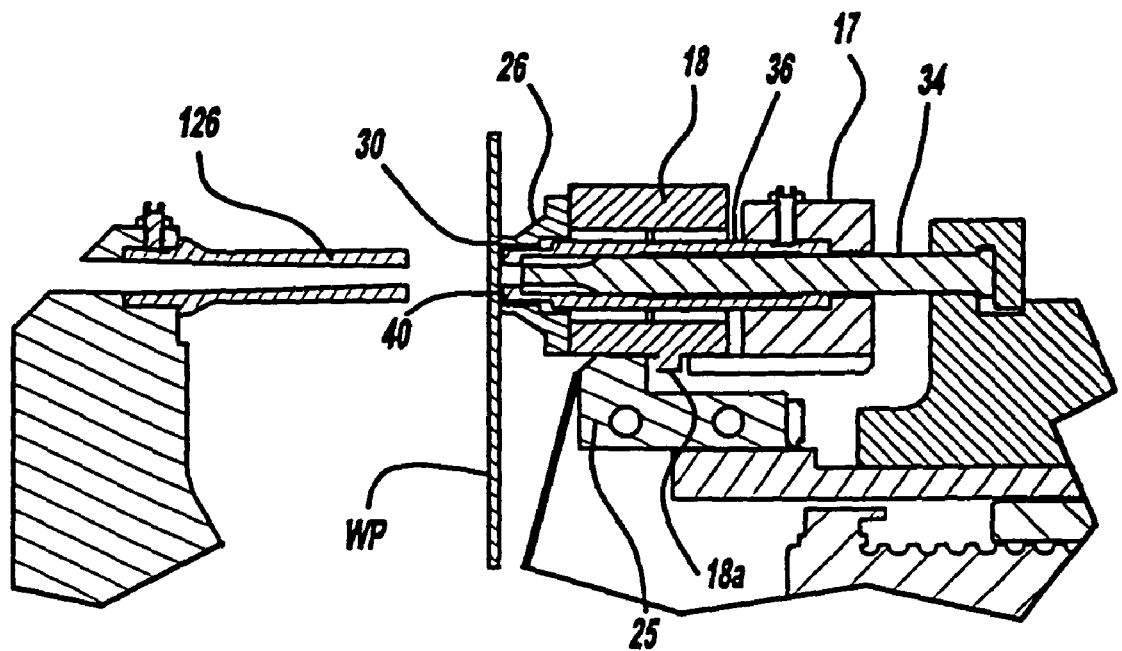
FIG. 6c is a view similar to FIGS. 6a–6b showing a subsequent step in the method of the present invention.

As seen in FIG. 6c, the pad forming device 10 "finds" the work piece WP by locating all three axes of the pad contacting surface 40 at the predefined net reference position such that the axial distance between the support surface 30 and the pad contacting surface 40 is representative of the difference between the original imprecise position of the inner body panel attachment location and the precisely located predefined net reference position therefor. After "finding" the work piece WP, the slide block 18 is locked into a fixed position, as will be described in detail hereinafter, such that the support surface 30 of the face plate 26 remains in contact with the work piece WP. The pad forming device 10 is now in position to form the pad P and punch the hole H.

Figure 6D:
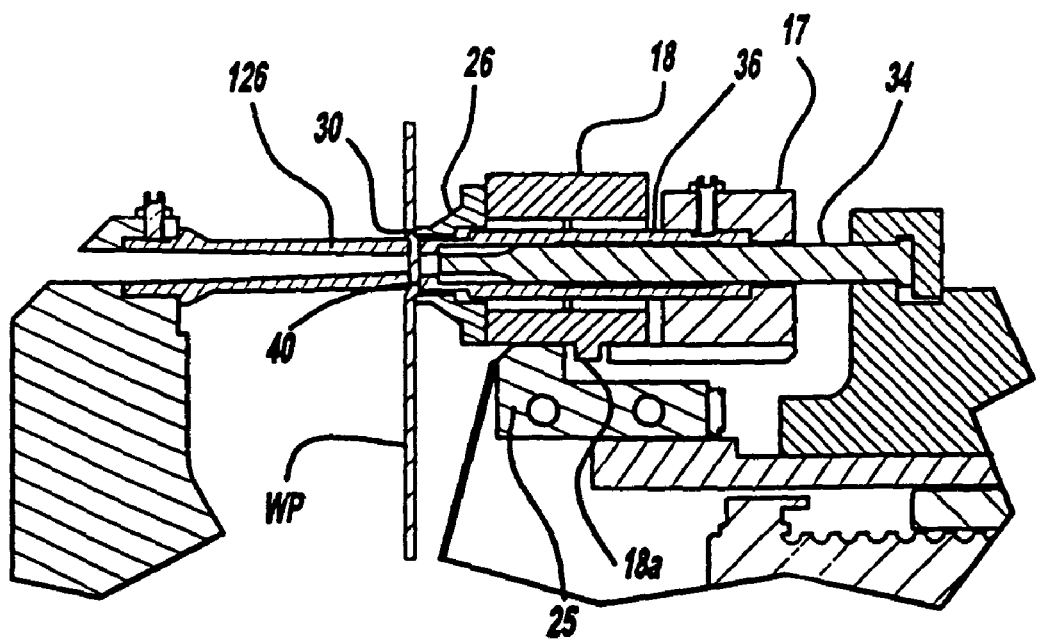
FIG. 6d is a view similar to FIGS. 6a–6c showing a subsequent step in the method of the present invention.
Figure 6E:
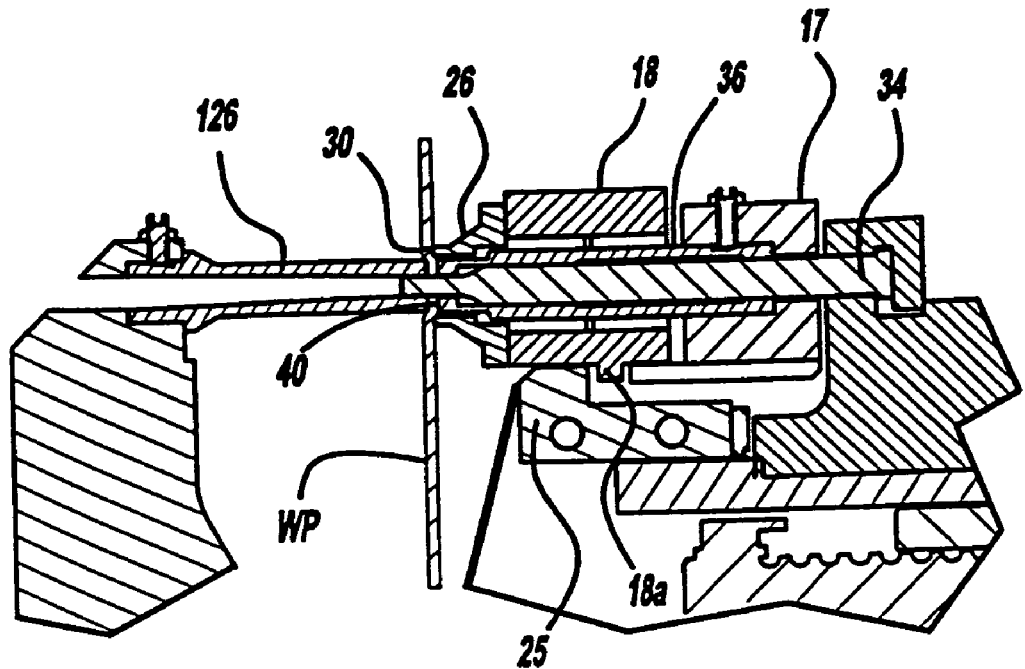
FIG. 6e is a view similar to FIGS. 6a–6d showing a subsequent step in the method of the present invention.

As shown in FIG. 6*d*, once the pad forming device 10 has "found" the work piece WP, and the slide block 18 has been locked in position, the portion of the work piece WP radially within the support surface 30 of the face plate 26 is deformed outwardly until it makes contact with the pad contacting surface 40 of the fixed anvil 36 to form the attachment pad P. As best seen in FIG. 5, this deforming is accomplished under a load that is imposed by a forming die 126 having a hollow central portion 128 therethrough. Referring to FIG. 6*e*, while the forming die 126 is in contact with the work piece WP, the punch 34 passes through the portion of the attachment pad P that is radially within and therefore unsupported by the forming die 126, and into the hollow central portion 128 thereof to punch the hole H.

Referring again to FIG. 2, reciprocation of the slide block 18 is actuated by first and second hydraulic work support devices 42, 42' of a known type, i.e. Hytec Hydraulic Work Support No. 100998 spring advance type work supports, attached to the first and second side plates 14, 16, respectively, in a conventional manner. U.S. Pat. No. 3,938,798 in the name of Solie et al. provides detailed disclosure pertaining to a similar work support device and accordingly is incorporated herein by reference in its entirety.

Figure 8A:
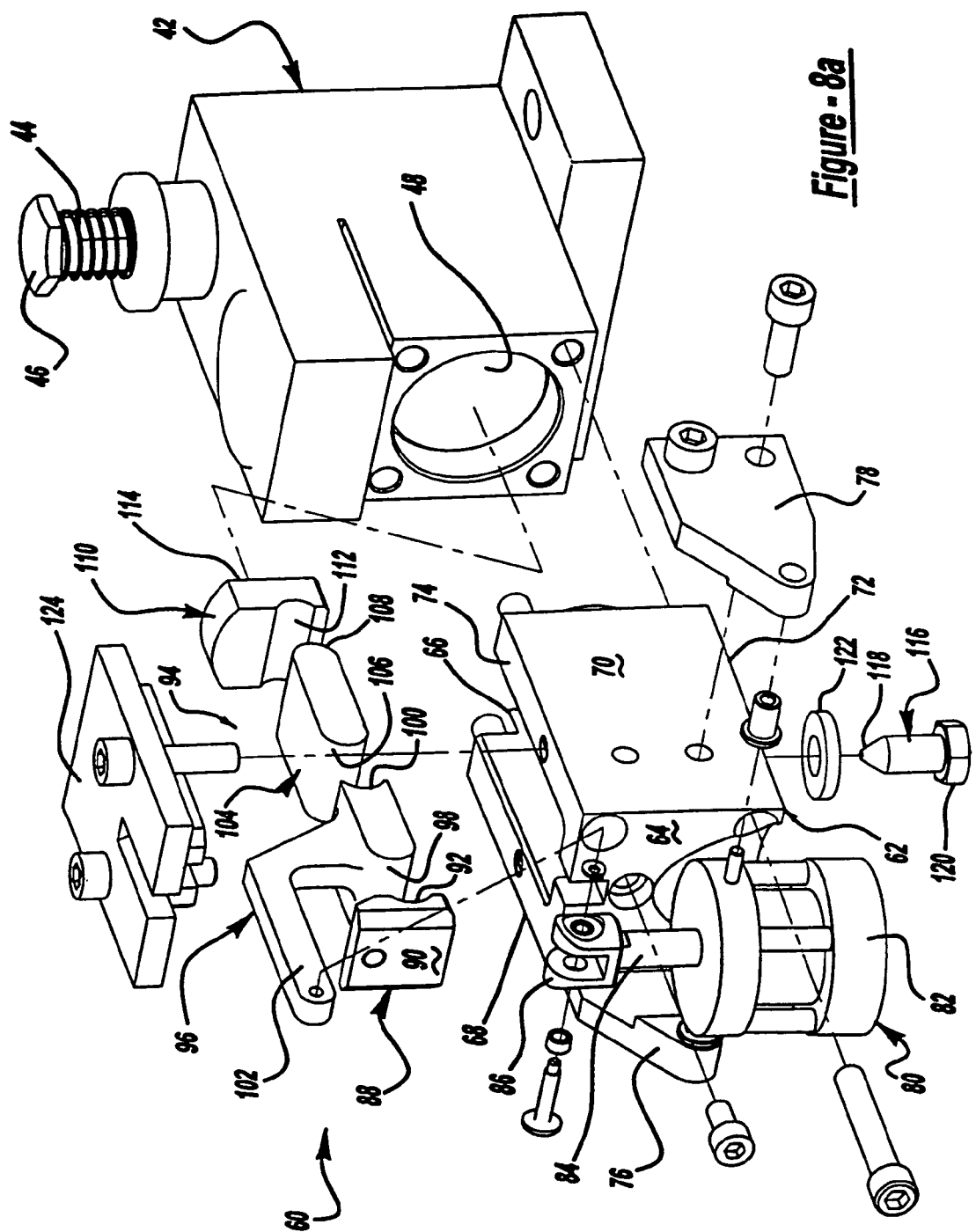
FIG. 8a is an exploded isometric view of a work support and pneumatic work support actuator of the apparatus shown in FIG. 2.

For purposes of clarity, only the composition and operation of the first hydraulic work support device 42 will be disclosed, however it should be appreciated that the preferred embodiment of the pad forming device 10 includes a second identical work support 42'. As shown in FIG. 8*a*, the hydraulic work support device 42 includes a plunger or piston rod 44 displaceably mounted therein that terminates in a pad 46. The plunger 44 is normally biased to a fully extended position by an internal spring (not shown). The hydraulic work support device 42 is adapted to lock the plunger 44 in place by contracting an internal sleeve or collet (not shown) to lockingly grip a circumferential portion (not shown) of the plunger 44 in its advanced position. Referring to FIGS. 9 and 10, the preferred embodiment of the present invention includes pneumatic work support actuators 60, 60' adapted to pneumatically actuate the locking mechanism of the first and second hydraulic work support devices 42, 42' such that hydraulic equipment is not required to operate the pad forming device 10.

Referring again to FIG. 8*a*, the internal sleeve (not shown) is contracted to lock the plunger 44 by applying force to a movable piston (not shown) within a cylinder 48 of the hydraulic work support device 42. Although the force applied to the movable piston is conventionally applied by hydraulic pressure, it should be appreciated that the work support locking mechanism may be actuated in response to a force applied by an alternate source adapted for such purpose as well. Additionally, it should be appreciated that while such actuation requires only a force of sufficient magnitude to overcome a nominal pre-load, the requisite magnitude for maintaining a hydraulic work support device 42 in the locked condition is proportional to the pre-load in combination with any opposing force externally applied to the plunger 44. For this reason, hydraulic work support devices 42 subjected to large external forces typically required hydraulic actuation as the compressibility of air renders pneumatic devices impractical.

Figure 8B:
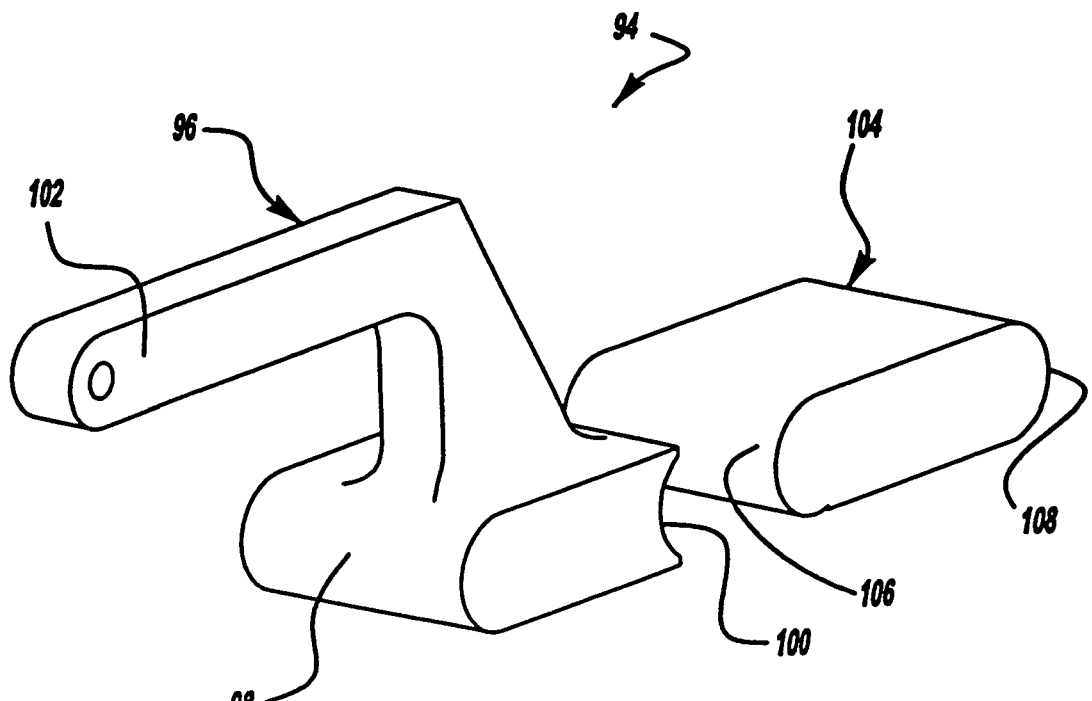
Figure 8C:
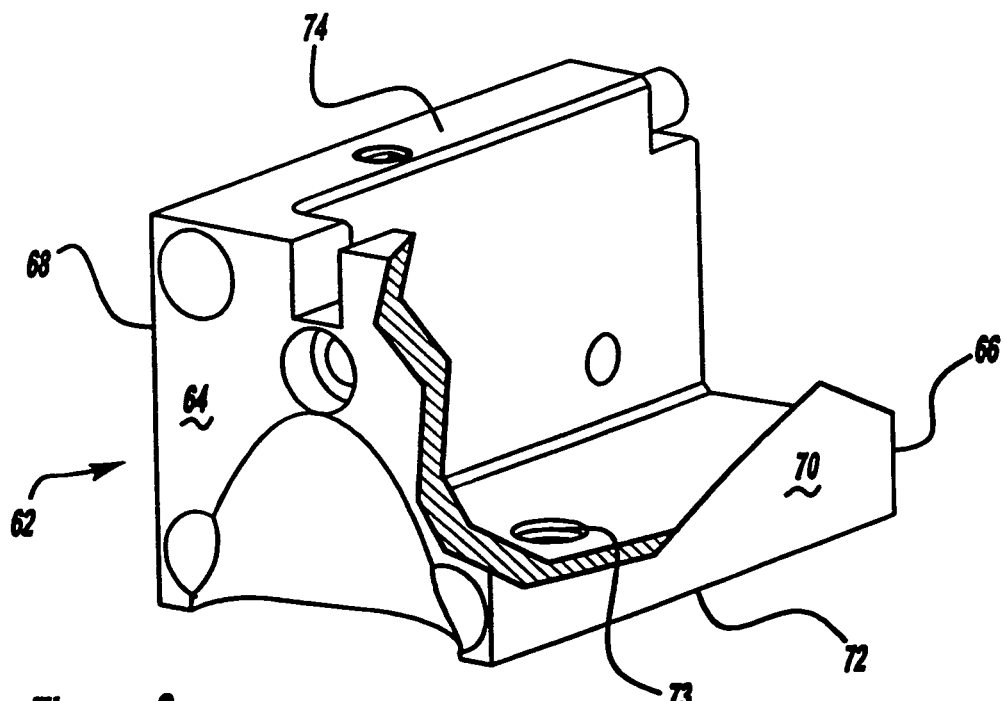

Again for purposes of clarity, only the composition and operation of the first pneumatic work support actuator 60 will be disclosed, however it should be appreciated that the pad forming device 10 includes a second identical pneumatic work support actuator 60' configured to actuate the second hydraulic work support device 42'. As shown in FIGS. 8*a*–8*c*, the pneumatic work support actuator 60 implements a toggle lock device 94 adapted to actuate the internal locking mechanism (not shown) of a hydraulic work support device 42 thereby locking the plunger 44 in place, and thereafter mechanically resisting an opposing force externally applied to the plunger 44, whereby the pneumatic work support actuator 60 is capable of resisting forces of substantially greater magnitude than heretofore possible with conventional pneumatic devices.

The pneumatic work support actuator 60 includes a housing 62 having an inlet end 64 and an open outlet end 66. The open outlet end 66 of the housing is attached to the work support cylinder 48 in a conventional manner, such as the cap screws shown in FIG. 8*a*. Brackets 76, 78 are similarly attached to opposing sides 68, 70 of the housing 62 near the inlet end 64 thereof, and extend in a direction away from the inlet end 64 of the housing 62. A pneumatic cylinder 80 of a known type, i.e. Bimba model number FM-1740-2FMT, is pivotally disposed between and attached to the brackets 76, 78 near the inlet end 64 of the housing 62. The pneumatic cylinder 80 includes a body portion 82, a piston rod 84 that is extendable and retractable in response to pneumatic pressure, and a coupling member 86 attached to the exposed end of the piston rod 84. A fixed spacer block 88 having a generally planar face 90 and an opposite face with a channel section 92 therein is disposed within and attached to the housing 62 such that the planar face 90 is mounted to an internal portion of the inlet end 64 with a cap screw and the channel section 92 runs between opposing sides 68, 70 of the housing.

The toggle lock portion 94 of the pneumatic work support actuator 60 is disposed within the housing 62 and preferably includes a first link member 96, and a second link member 104. The first and second link members 96, 104 are generally rectangular with complementary radial end portions. The first link member 96 includes a convex end 98 pivotally engaged in the channel section 92 of the fixed spacer block 88, an opposite concave end 100 adapted to accommodate the second link member 104, and an integral lever arm 102 pivotally attached to the coupling member 86 of the pneumatic cylinder 80. The second link member 104 includes opposing convex ends 106, 108 adapted to pivotally engage the first link member 96 and a piston engagement member 110, respectively. The piston engagement member 110 includes a surface having a channel section 112 adapted to accommodate the second link member 104 and an opposite planar surface 114 adapted to engage the movable piston (not shown) of the hydraulic work support device 42. A support pin 116 is inserted through a hole 73 in a bottom portion 72 of the housing such that a pointed engagement end 118 of the support pin 116 supports the toggle lock device 94 to prevent over-travel thereof. A spacer element 122 disposed between a head portion 120 of the support pin 116 and the bottom portion 72 of the housing 62 is preferably ground to a width that precisely limits insertion of the pointed engagement end 118 of the support pin 116 such that the link members 96, 104 are within ±0.3° of co-planar alignment when the toggle lock device 94 is supported thereby. A top plate 124 attached to an otherwise open top portion 74 of the housing 62, preferably with cap screws, retains the first and second link members 96, 104 within the housing 62 and further prevents over-travel of the toggle lock device 94.

Figure 11:
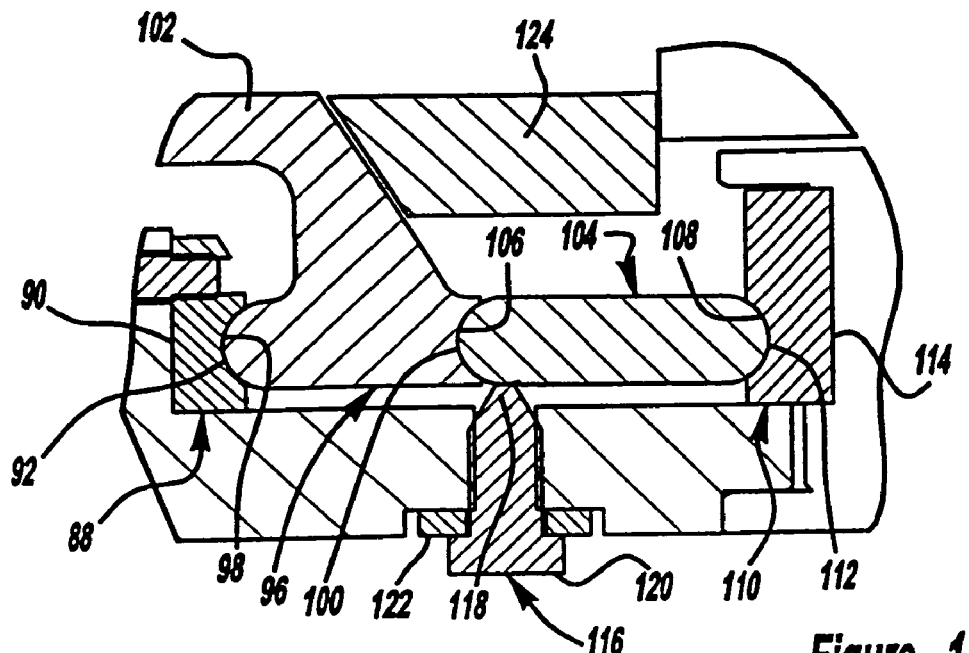
FIG. 11 is a section taken along line 11—11 of FIG. 10, showing the toggle lock device of FIG. 8b in the locked position.
Figure 12:
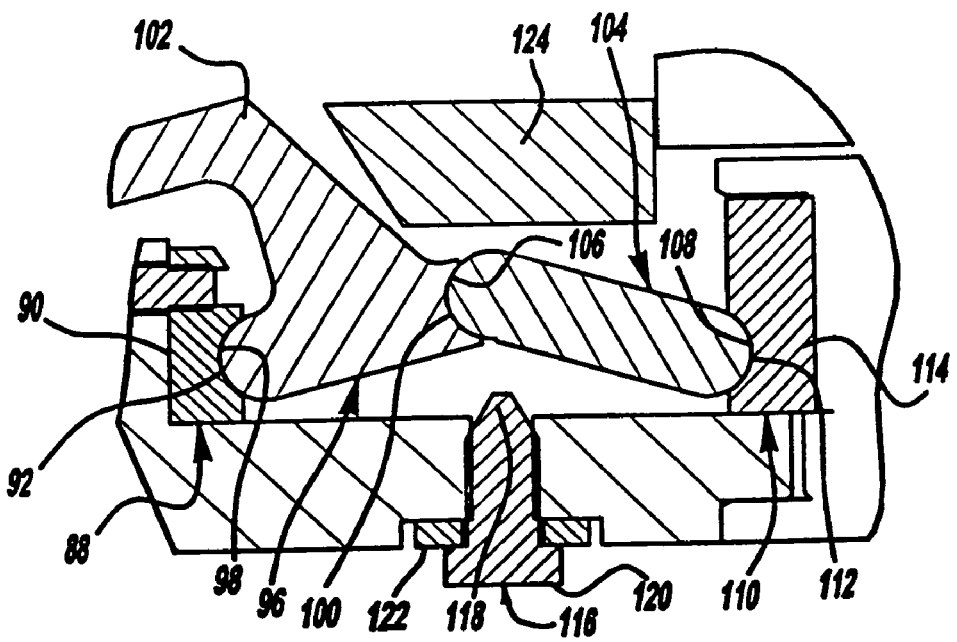
FIG. 12 is a section taken along line 11—11 of FIG. 10, showing the toggle lock device of FIG. 8b in the unlocked position.

Extension of the pneumatic cylinder 80 of the piston rod 84, and the integral lever arm 102 indirectly attached thereto, applies a moment of inertia about the first link member's 96 convex end 98 that is pivotally engaged in the channel section 92 of the fixed spacer block 88, tending to align the first and second link members 96, 104 and thereby engage the toggle lock device 94. Conversely, retraction of the piston rod 84 applies an opposite moment of inertia tending take the first and second link members 96, 104 out of alignment thereby disengaging the toggle lock device 94. FIGS. 11 and 12 respectively show the locked and unlocked positions of the toggle lock device 94.

Referring again to FIGS. 8a–8c, when the pneumatic cylinder 80 of the piston rod 84 is extended, the corresponding alignment of the first and second link members 96, 104 has the effect of advancing the piston engagement member 110 into the work support cylinder 48 of the hydraulic work support device 42 such that a force is applied to the movable piston (not shown), the internal sleeve (not shown) of the hydraulic work support device 42 is contracted and the work support plunger 44 is locked. When the toggle lock device 94 is engaged, it can mechanically resist substantial force applied along the axis of alignment thereof, as is the case with an external force applied to the work support plunger 44 in that any such force is translated through the movable piston and to the toggle lock device 94 along its axis of alignment. In this manner, the pneumatic work support actuator 60 is capable of maintaining the hydraulic work support device 42 in the locked condition under much greater loads than heretofore possible with devices relying exclusively on pneumatic pressure.

Referring again to FIG. 6d, after the pad forming device 10 has "found" the work piece WP as described hereinabove, the portion of the work piece WP radially within the support surface 30 of the face plate 26 is deformed outwardly until it makes contact with the pad contacting surface 40 of the fixed anvil 36. As best seen in FIGS. 2–5, this deforming is accomplished under a load that is imposed by the forming die 126, that is attached to a die block 130. The die block 130 is reciprocated between the broken line position and the solid line position shown in FIG. 4 by a form ram 132 driven by a ball screw device 134 described in detail hereinafter.

As best seen in FIG. 4, a reversible electric servo-motor 140 is mounted to the back of the motor plate 12 in alignment with the aperture 12a to drivingly engage the ball screw device 134 which is adapted to convert the rotation of the servo-motor 140 into translatory motion. The ball screw device 134 includes a screw member 136, a nut member 138 threaded thereon, and a plurality of balls therebetween (not shown). The ball screw device 134 is disposed generally parallel with and between the first and second side plates 14, 16, extends in a first direction through the aperture 12a of the motor plate 12 to engage the servo-motor 140, and extends in the opposite direction into engagement with the form ram 132. The nut member 138 is disposed within and attached to a hollow engagement portion 132a (not shown) of the form ram 132, and is translated along the length of the screw member 136, in a fore/aft direction, in response to the servo-motor 140. Actuation of the servo-motor 140 is controlled by a programmable control device (not shown) that is generally well known and may take the form of any suitable programmable microprocessor.

A linear transducer (not shown) operatively connected to the form ram 132 generates position feedback signals used by the programmable control device to achieve a desired position and motion for the forming die 126. Accordingly, the servo-motor 140 is operated by program controls to drive the form ram 132 through various stroking modes, in which ram position, velocity, and acceleration may be programmed to vary over the course of a stroke and simultaneously monitored. The more sophisticated programmable forming motion disclosed hereinabove adds flexibility such that a single pad forming device 10 is able to accommodate a variety of different applications. For example, a single pad forming device 10 may form a first pad P in a relatively thin portion of the work piece WP using a slower stroke speed, and thereafter form a second pad P in a relatively thicker portion of the work piece WP using a faster stroke speed. As another example, the cycle time can be reduced by varying the speed of the form ram 132 over the forming cycle with a rapid ram advance and retraction combined with slow speed during the actual forming and/or piercing.

After an attachment pad P (shown in FIG. 7) has been formed in the manner described hereinabove, and before the form ram 132 is extended to retract the forming die 126 from the work piece WP, it is frequently desirable to form an aperture in the raised attachment pad P by lancing an opening, punching a slug, or by piercing, to provide an attachment aperture such as hole H (shown in FIG. 7) adapted to facilitate the subsequent attachment of an outer body panel. The lancing, punching, or piercing of the raised attachment pads P may be done most conveniently by the pad forming device 10, before it is withdrawn from the work piece WP. For this purpose a second ball screw device 134' is provided to drive the punch 34 in a manner similar to that in which the forming die 126 is driven by the ball screw device 134. A second reversible electric servo-motor 140' is mounted to the back of the motor plate 12 in alignment with the aperture 12b to drivingly engage the second ball screw device 134'. The second ball screw device 134' is disposed generally parallel with and between the first and second side plates 14, 16, extends in a first direction through the aperture 12b of the motor plate 12 to engage the second reversible servo-motor 140', and extends in an opposite direction into engagement with a punch ram 142. A nut member 138' of the second ball screw device 134' is disposed within and attached to a hollow engagement portion 142a (not shown) of the punch ram 142, and is translated along the length of a screw member 136', in a fore/aft direction, in response to the second reversible servo-motor 140'. A carriage 146 is mounted to the punch ram 142 and extends therefrom in an upward direction. A back up 148 is mounted to the carriage 146 such that the punch 34 is removably secured therebetween. Accordingly, as shown in FIG. 6e, actuation of the second reversible servo-motor 140' drives the punch 34 through the portion of the raised attachment pad P that is radially within and therefore unsupported by the forming die 126, and into the hollow central portion 128 thereof to punch the hole H (shown in FIG. 7).

A second linear transducer (not shown) operatively connected to the punch ram 142 generates position feedback signals used by the programmable control device to achieve a desired position and motion for the punch 34. The second reversible servo-motor 140' is operated by program controls to drive the punch ram 142 through various stroking modes, in which punch position, velocity, and acceleration may be programmed to vary over the course of a single stroke. As the stroke length of the punch 34 is variable, a single pad forming device 10 may be configured to punch a variety of hole sizes and/or shapes for different applications. For this purpose, as shown in FIG. 5, the punch 34 includes a primary cutting surface 34a at an end portion thereof, and a secondary cutting surface 34b located a predetermined axial distance therefrom. In one example, the primary cutting surface 34a defines a circle and the secondary cutting surface 34b defines an oval that radially encompasses the circle defined by the primary cutting surface 34a. A round hole can be formed by limiting the punch 34 stroke length such that only the primary cutting surface 34a engages the work piece WP, whereas extending the stroke length such that both the initial and second cutting surfaces 34a, 34b pass through the work piece WP and provides an elongated slot.

Additionally, the second linear transducer can be configured to provide an electrical current signature for the punch 34, which, as is well known in the art, can be used for error proofing the punching process. Punch resistance during engagement with the work piece WP generates a current spike indicative of a successful operation, and conversely, the absence of a current spike indicates the desired operation was not properly performed (i.e. the punch broke and did not engage the work piece WP). Therefore, the pad forming device 10 can be programmed to automatically shut down and alert an operator the first time the punching operation is unsuccessful, and any related problems can be immediately addressed.

Figure 13:
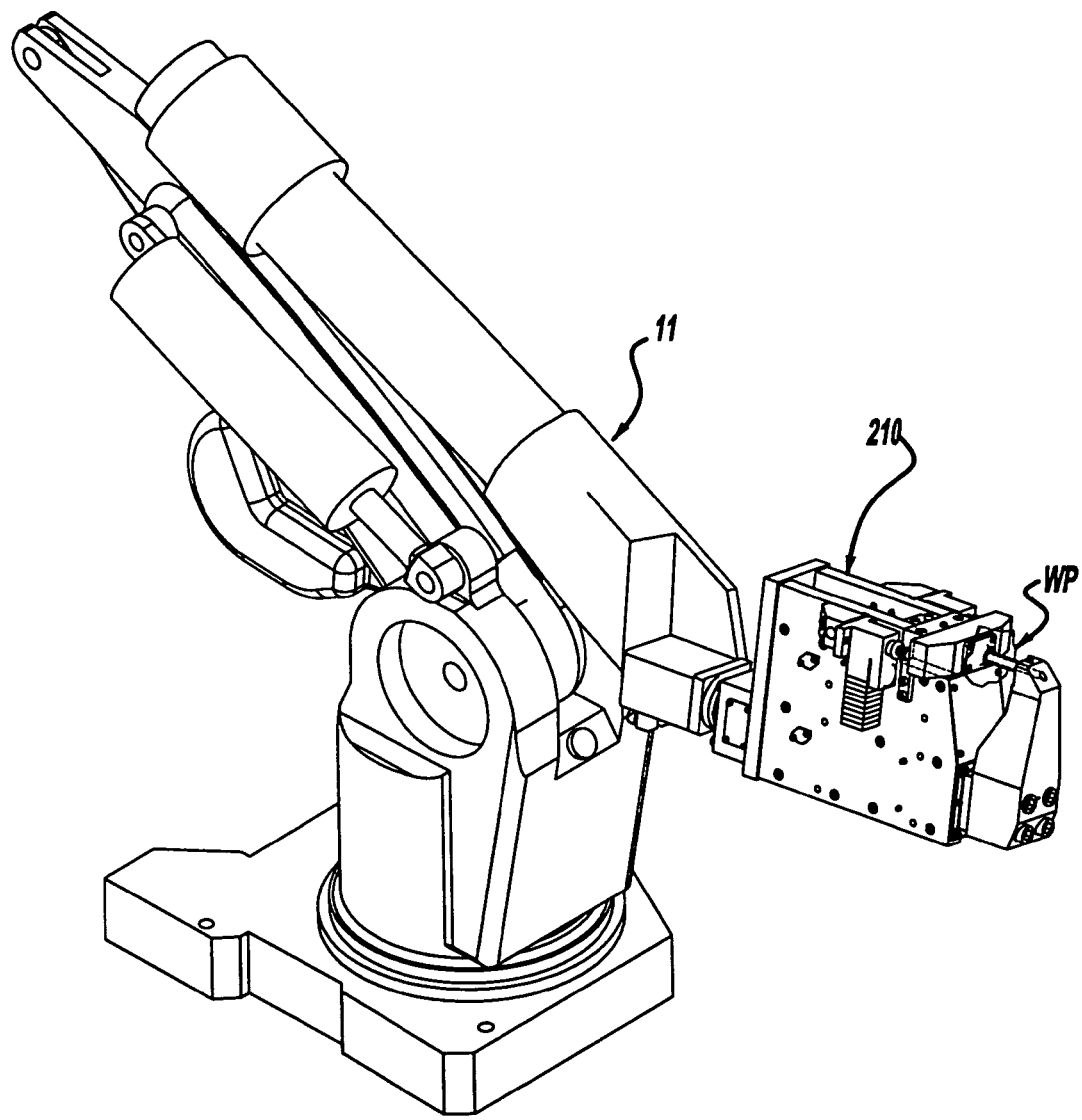
FIG. 13 is a side view of an alternative embodiment of the apparatus according to the present invention shown attached to a robot.
Figure 14:
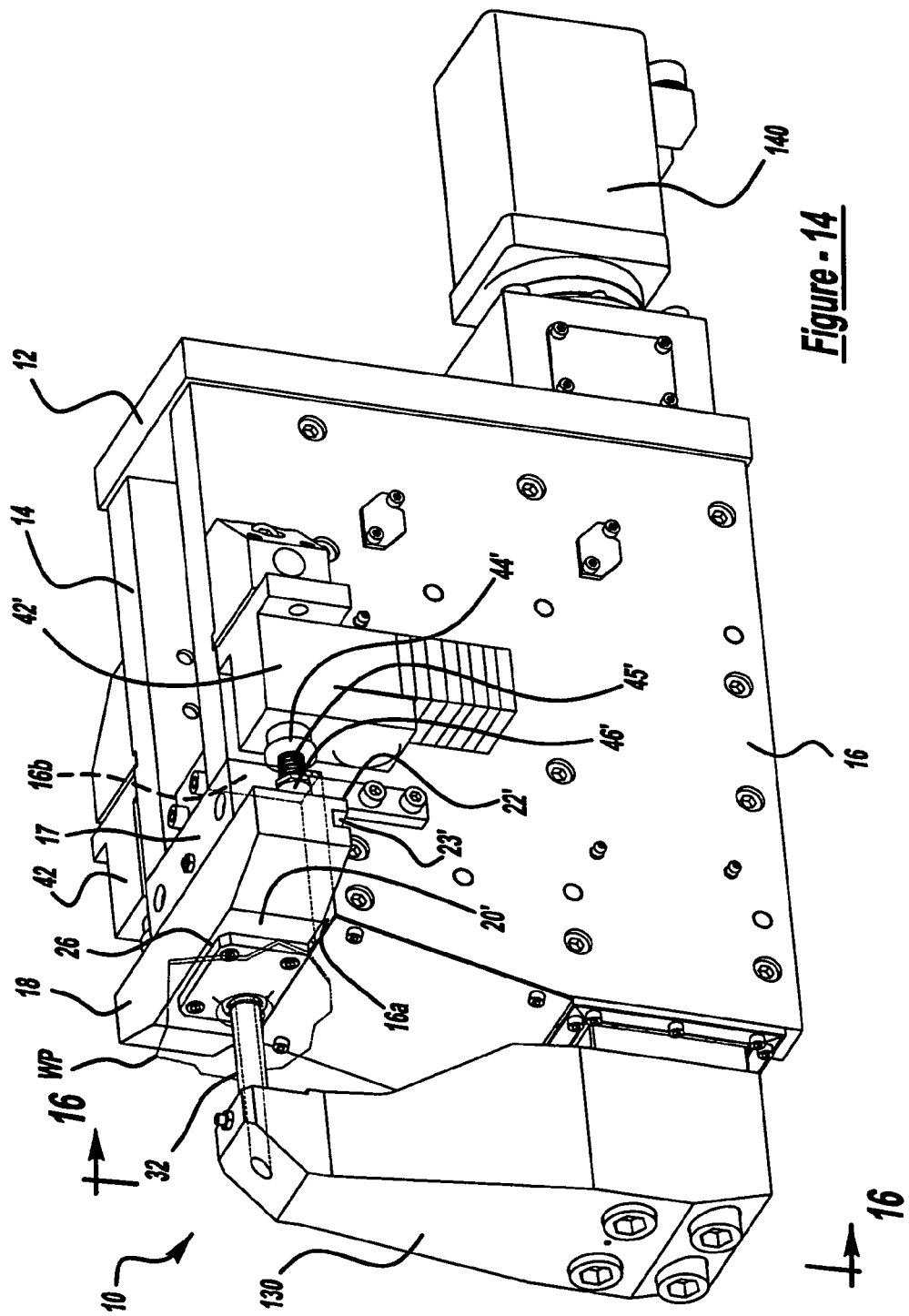
FIG. 14 is an isometric view of the apparatus of FIG. 13.

Referring now to an alternative embodiment, there is shown in FIGS. 13 and 14, a net locating device, or a form and clinch device 210, that is constructed in accordance with the present invention. Many of the sub-assemblies and components of the form and clinch device 210 are identical to the sub-assemblies and components of the previously described embodiment. Thus, many of the numerals used to describe the present embodiment will also be the same as those used in the previously described embodiment.

Figure 19:
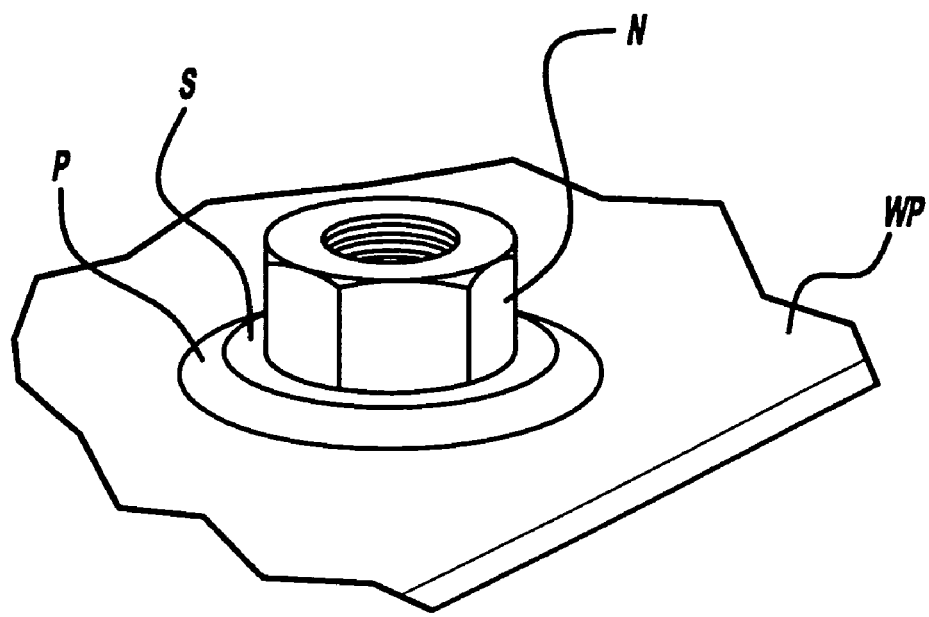
FIG. 19 is a partial isometric view showing an inner body panel formed and clinched by the apparatus of FIG. 14 according to the alternative method of FIGS. 18a–18e.

One or more programmable robots 11 move the form and clinch device 210 into and out of working engagement with a work piece WP, and precisely position the form and clinch device 210 relative to specific locations on the work piece WP. The form and clinch device 210 is adapted to form an attachment pad P (shown in FIG. 19) at one or more specific locations on the work piece WP, such that an external surface S of each attachment pad P is precisely located at a predefined net reference position independently defined for each location, and thereafter clinch a nut N (shown in FIG. 19) to the attachment pad P. As long as the work piece WP is within an acceptable tolerance range, it is provided with the attachment pad P having the external surface S precisely located at the predefined net reference position, and a complementary member or component is attachable thereto without any further processing or adjustments.

Again, the work piece WP should be considered to represent an automotive body panel, however it should be appreciated that the work piece WP is intended to encompass other structural elements in other environments as well. Furthermore, although the present embodiment disclosed herein refers to the net attachment of a fastener to an automotive body panel, the invention is equally adapted for the net attachment of other components such as hinges, latches, etc., and to various other components such as tail lamps, bumpers, fascias, head lamps, fuel filler doors, etc. Finally, relative terms such as front, rear, top, bottom, etc. apply to the form and clinch device 210 as viewed in FIG. 14, wherein a die block 130 defines the front, and servo-motor 140 defines the rear.

Figure 15:
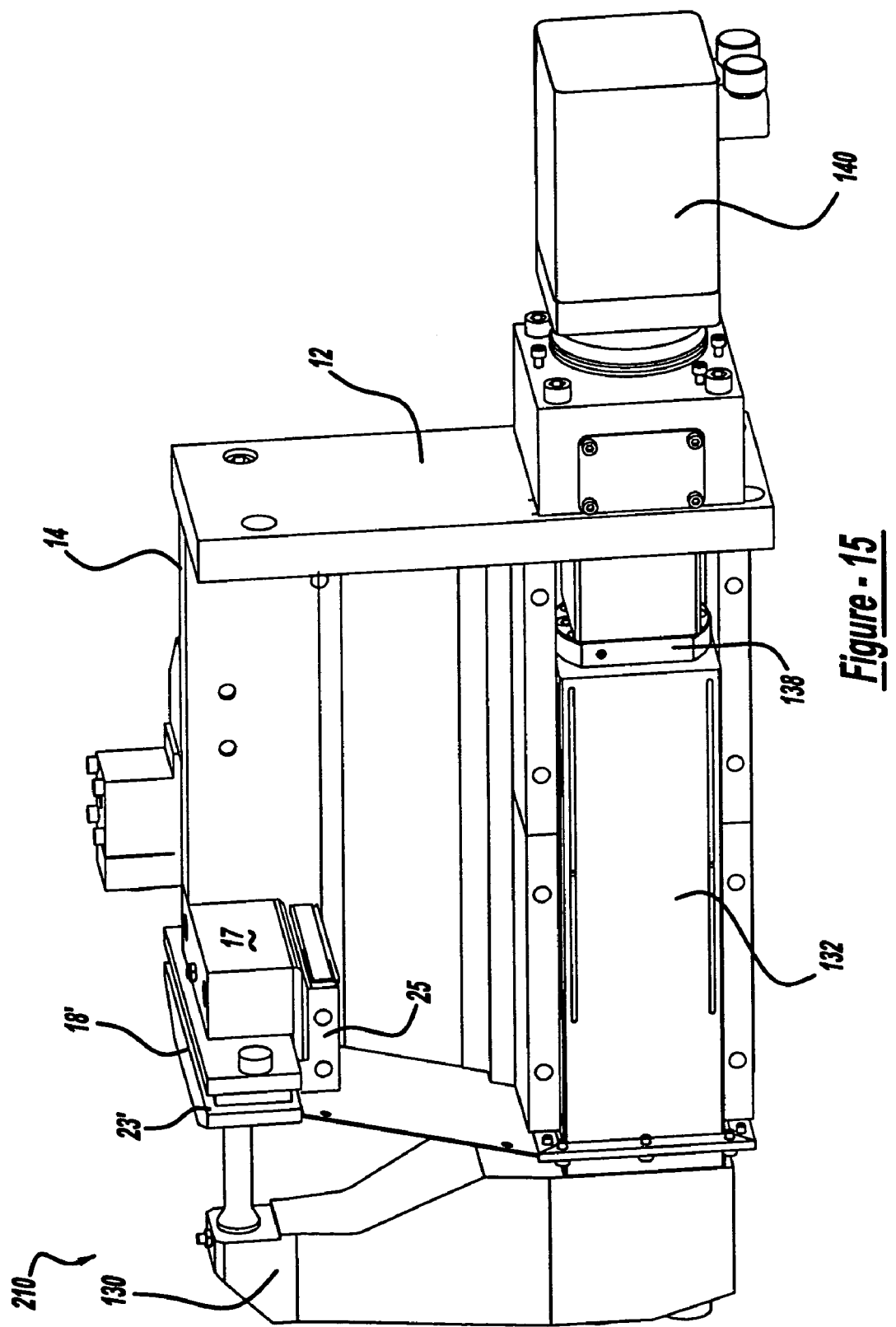
FIG. 15 is a cutaway side view of the apparatus of FIG. 14.
Figure 16:
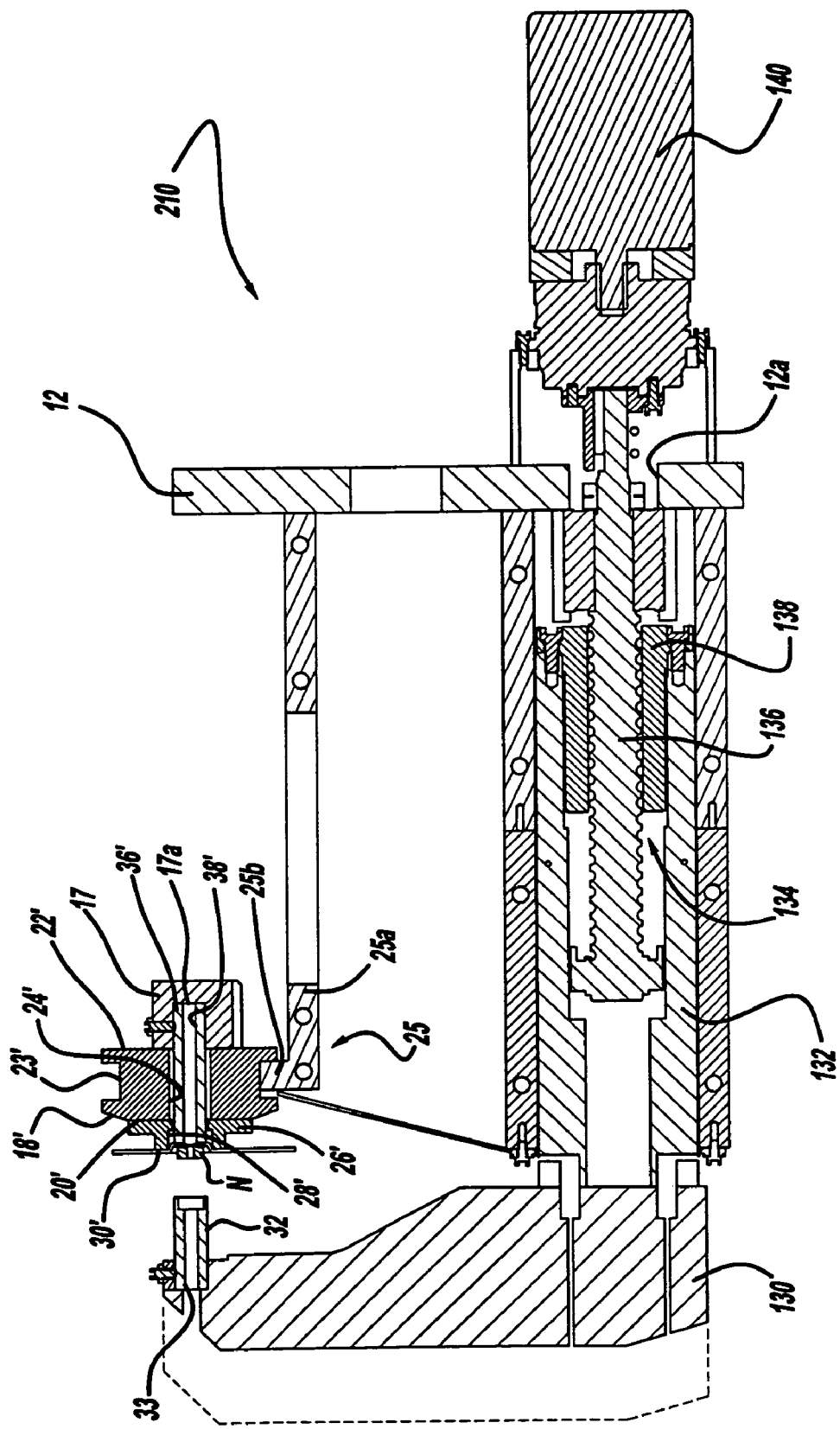
FIG. 16 is a section taken along line 16—16 of FIG. 14.

Referring generally now to FIGS. 14–16, the form and clinch device 210 includes a generally rectangular motor plate 12, which has an aperture 12a (see FIG. 16). The servo-motor 140 is respectively aligned with the aperture 12a and thereafter mounted to the motor plate 12 as will be explained more fully hereinafter. The form and clinch device 210 also includes spaced apart generally parallel side plates 14, 16 that are attached to the motor plate 12 opposite the servo-motor 140, and extend therefrom in a forward direction. The side plates 14, 16 respectively have recessed portions (exemplified by 16a) that define shoulders (exemplified by 16b) that are generally parallel to the motor plate 12. It should be appreciated that the side plates 14 and 16 are generally identical and while the recessed portion and shoulder of side plate 14 are not identified in the figures, they are similar to the recessed portion 16a and the shoulder 16b, respectively.

A retainer block 17 mounts to the side plates 14, 16 such that the retainer block 17 is supported by shoulders 16b in a fore/aft direction, and is rigidly attached to the recessed portions 16a in an up/down direction. As best shown in FIG. 16, retainer block 17 includes a passage 17a therein. The retainer block 17 is thus rigidly fixed to the side plates 14, 16 and is provided to hold a fixed anvil 36' thereto, such as via a set screw arrangement as shown.

Figure 17:
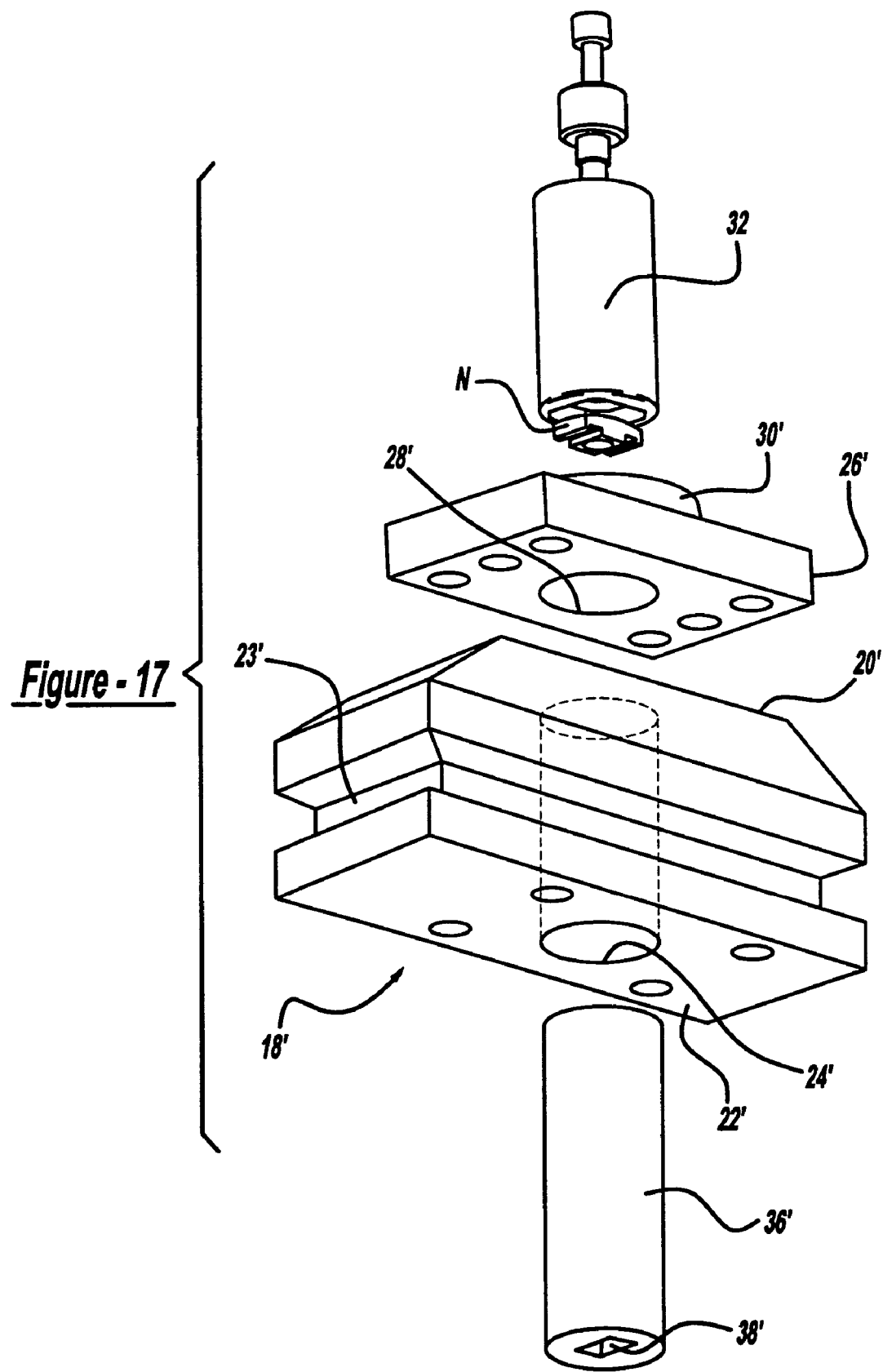
FIG. 17 is an exploded view showing details of the forming and clinching components of the apparatus of FIG. 14.

An L-shaped spacer 25 having a leg portion 25a and a foot portion 25b is disposed between the side plates 14, 16 and attached thereto such that the leg portion 25a is located below the recessed portions 14a, 16a and the foot portion 25b extends above the recessed portions 14a, 16a of the side plates 14, 16. Referring to FIGS. 16 and 17, a slide block 18', includes a front surface 20', a rear surface 22', a passage 24' therethrough, and an exterior groove 23'. The slide block 18' is freely movable with respect to the rigidly fixed retainer block 17, and is adapted to translate in a fore/aft direction. Also, the slide block 18' is piloted about the fixed anvil 36' extending through the passage 24', and is engaged within the exterior groove 23' by an uppermost surface of the foot portion 25b, which is configured to guide the slide block 18' and prevent rotation thereof. The up/down position of the slide block 18' may be adjusted, which specifically involves grinding the foot portion 25b of the L-shaped spacer 25 by an amount necessary to lower the slide block 18' to an aligned up/down position therefor. The slide block 18' includes the exterior groove 23' formed therein, which is adapted to limit the range of motion of the slide block 18' by engaging one face of the foot portion 25b of the L-shaped spacer 25 at a forward end of travel and another face of the foot portion 25b at a rearward end of travel.

Similar to the previously disclosed embodiment, a face plate 26' having a support surface 30' and a passage 28' therethrough is mounted to the front surface 20' of the slide block 18' such that the passage 28' of the face plate 26' and the passage 24' of the slide block 18' are aligned. The fixed anvil 36' is disposed within the passage 17a of the retainer block 17 and is rigidly attached thereto such that the fixed anvil 36' extends through the passage 24' of the slide block 18' and into the passage 28' of the face plate 26' terminating therein with a pad contacting surface 40' (shown in FIG. 18a). The pad contacting surface 40' of the fixed anvil 36' supports the external surface S of the attachment pad P (shown in FIG. 19) during the formation thereof, and is therefore subjected to the resultant force generated during impact. It should be appreciated that the motor plate 12, the side plates 14, 16 and the retainer block 17 are configured to absorb such force acting on the pad contacting surface 40' of the fixed anvil 36' in a rearward direction. A clinch nut attachment apparatus is defined by a forming die 32 that holds the nut N. The forming die 32 includes a throughbore 33 extending longitudinally therethrough.

As best seen in FIG. 16, a reversible electric servo-motor 140 is mounted to the back of the motor plate 12 in alignment with the aperture 12a to drivingly engage the ball screw device 134 which is adapted to convert the rotation of the servo-motor 140 into translatory motion. The ball screw device 134 includes a screw member 136, a nut member 138 threaded thereon, and a plurality of balls therebetween (not shown). The ball screw device 134 is disposed generally parallel with and between the first and second side plates 14, 16, extends in a first direction through the aperture 12a of the motor plate 12 to engage the servo-motor 140, and extends in the opposite direction into engagement with a form ram 132. The nut member 138 is disposed within and attached to a hollow engagement portion (not shown) of the form ram 132, and is translated along the length of the screw member 136, in a fore/aft direction, in response to the servo-motor 140. Actuation of the servo-motor 140 is controlled by a programmable control device (not shown) that is generally well known and may take the form of any suitable programmable microprocessor.

A linear transducer (not shown) operatively connected to the form ram 132 generates position feedback signals used by the programmable control device to achieve a desired position and motion for the forming die 32. Accordingly, the servo-motor 140 is operated by program controls to drive the form ram 132 through various stroking modes, in which ram position, velocity, and acceleration may be programmed to vary over the course of a stroke and simultaneously monitored. The more sophisticated programmable forming motion disclosed hereinabove adds flexibility such that a single form and clinch device 210 is able to accommodate a variety of different applications. For example, a single form and clinch device 210 may form a first pad P in a relatively thin portion of the work piece WP using a slower stroke speed, and thereafter form a second pad P in a relatively thicker portion of the work piece WP using a faster stroke speed. As another example, the cycle time can be reduced by varying the speed of the form ram 132 over the forming cycle with a rapid ram advance and retraction combined with slow speed during the actual forming and/or piercing.

Figure 18A:
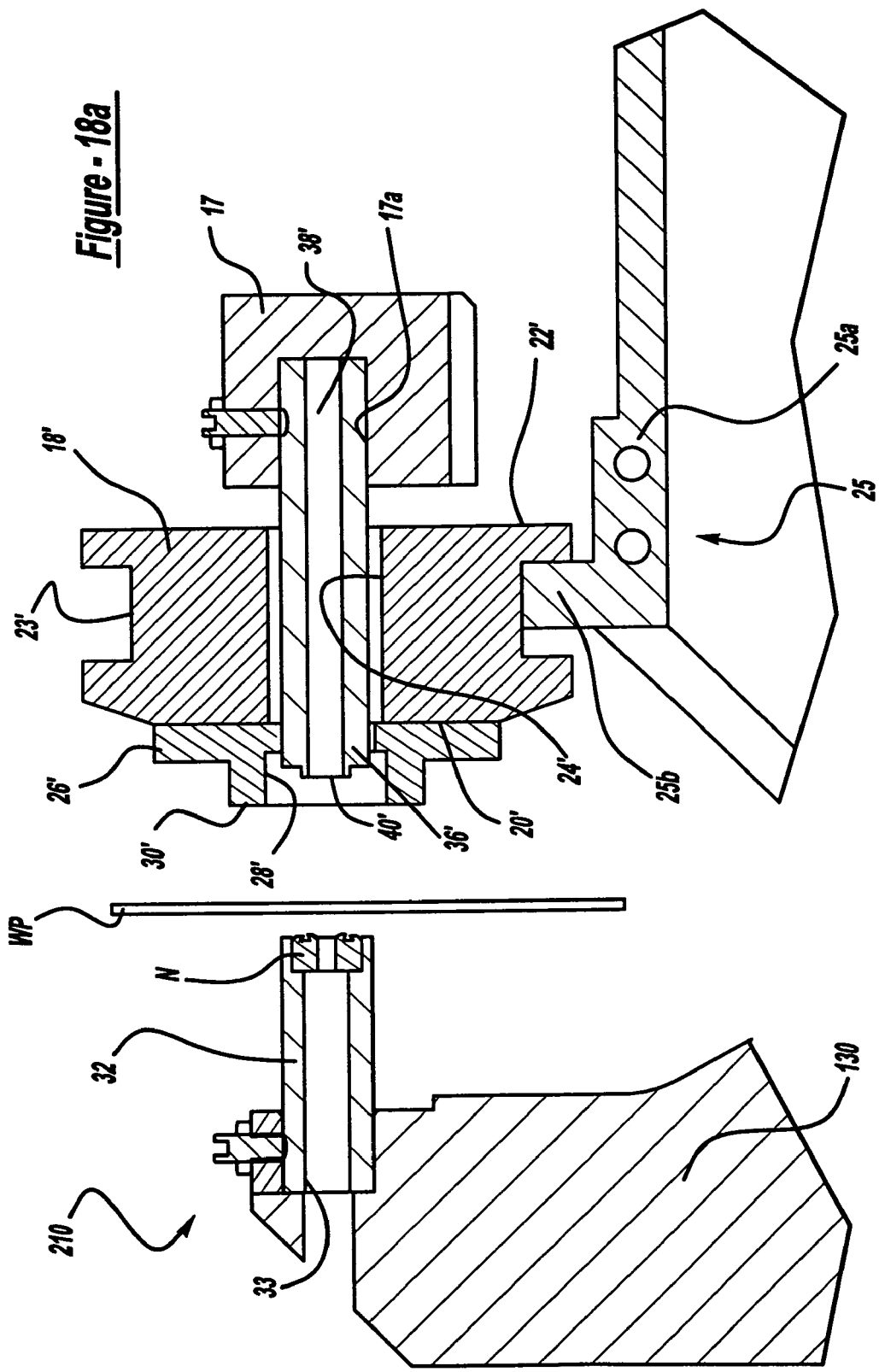
FIG. 18a is a fragmentary schematic view showing a step in an alternative method of the present invention using the apparatus of FIG. 14.

Referring to FIGS. 18a–18e, the slide block 18' is biased by the hydraulic work supports 42, 42' (shown in FIG. 14) in a fully extended position as will be described in detail hereinafter. Accordingly, the support surface 30' of the face plate 26' protrudes axially beyond the pad contacting surface 40' of the fixed anvil 36' by an amount equivalent to the maximum allowable pad depth for a particular application, and the L-shaped spacer 25 engages the external groove 23'. The programmable robot 11 and associated programmable motion controls rapidly move the form and clinch device 210 into position with respect to the work piece WP (best shown in FIG. 13). As shown in FIG. 18a, this movement results in the fixed anvil 36' being positioned in the vicinity of the work piece WP but at a known distance therefrom. The programmable robot 11 then moves the form and clinch device 210 into final position by moving the form and clinch device 210 along the axis of the fixed anvil 36' in a direction generally perpendicular to the work piece WP such that the X, Y, and Z axes of the pad contacting surface 40' of the fixed anvil 36' are precisely positioned relative to the X, Y, and Z axes of a predefined net reference position for a specific location on the work piece WP where work is to be performed.

As seen in FIG. 18a, the pad contacting surface 40' is initially aligned with the predefined reference position and positioned apart from the work piece WP by an amount sufficient to ensure that support surface 30' of the face plate 26' does not prematurely engage the work piece WP. Thereafter, the robot 11 moves the form and clinch device 210 (shown in FIG. 13) along the axis of the fixed anvil 36', toward the work piece WP in a direction generally perpendicular thereto, in order to bring the X, Y, and Z axes of the pad contacting surface 40' into position with the X, Y, and Z axes of the predefined net reference position. As the pad contacting surface 40' approaches the work piece WP, the fully extended support surface 30' of the face plate 26' comes into initial contact with the work piece WP, as shown in FIG. 18b.

As shown in FIG. 18c, additional advancement of the pad contacting surface 40' toward the work piece WP overcomes the fully extended bias of the slide block 18', which effectively retracts the support surface 30' of the face plate 26' relative to the pad contacting surface 40' of the fixed anvil 36' until the fixed anvil 36' reaches the predefined net reference position. As seen in FIG. 18c, the form and clinch device 210 "finds" the work piece WP by locating all three axes of the pad contacting surface 40' at the predefined net reference position such that the axial distance between the support surface 30' and the pad contacting surface 40' is representative of the difference between the original imprecise position of the inner body panel attachment location and the precisely located predefined net reference position therefor. After "finding" the work piece WP, the slide block 18' is locked into a fixed position, as will be described in detail hereinafter, such that the support surface 30' of the face plate 26' remains in contact with the work piece WP. The form and clinch device 210 is now in a starting position to form the pad P and clinch the nut N. The nut is held within a pocket of the forming die and the work piece WP lies flat across the pad contacting surface 40' of the anvil 36'.

Figure 18D:
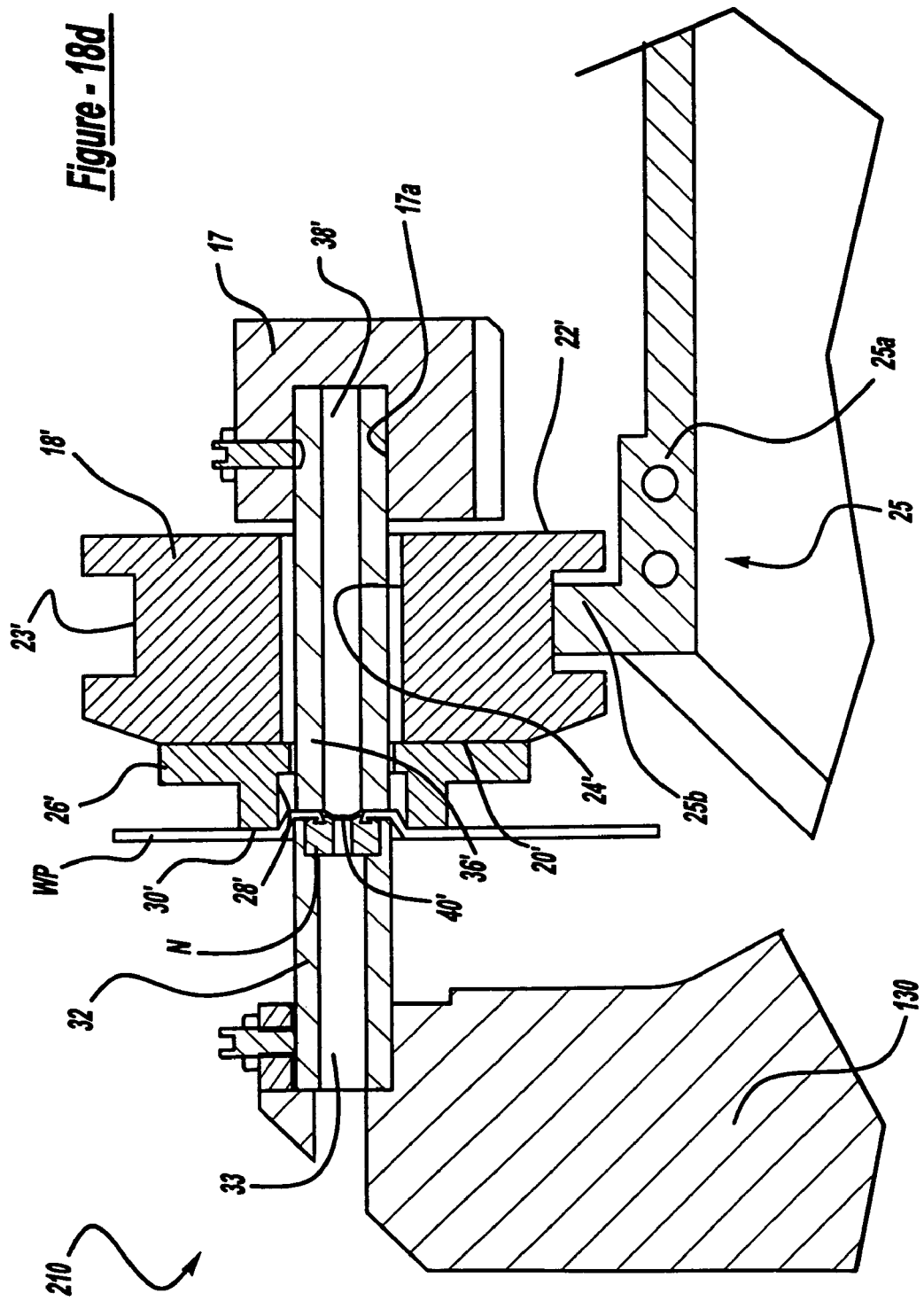
FIG. 18d is a view similar to FIGS. 18a–18c showing a subsequent step in the alternative method of the present invention.

Referring to FIG. 18d, after the form and clinch device 210 has "found" the work piece WP as described hereinabove, the die block strokes toward the work piece WP. Accordingly, the nut N comes into contact with the work piece WP and, as is well known in the art, a projection of the nut N punches a hole H into the work piece WP, thereby producing a blank (not shown). Such clinch nut is available from ARNOLD & SHNJO GmbH & Co. KG. The blank falls through the throughbore 33 of the forming die 32. Alternatively, the blank could fall through the hollow portion 38' of the anvil 36', in which case an escape passage (not shown) could be provided in the retainer block 17 that is concentric with the hollow portion 38' of the anvil 36'. As the nut N punches the work piece WP, the pad contacting surface 40' deforms an annular portion of the work piece WP into locked interengagement with an annular channel within the nut N. In combination with the known technique of nut clinching, the present invention uniquely provides for the portion of the work piece WP radially within the support surface 30' of the face plate 26' to be deformed outwardly until it makes contact with the pad contacting surface 40' of the fixed anvil 36'. As best seen in FIGS. 14-17, this deforming is accomplished under a load that is imposed by the forming die 126', that is attached to a die block 130'. The die block 130' is reciprocated between the broken line position and the solid line position shown in FIG. 16 by the form ram 132 driven by the ball screw device 134 described in detail previously.

Figure 18F:
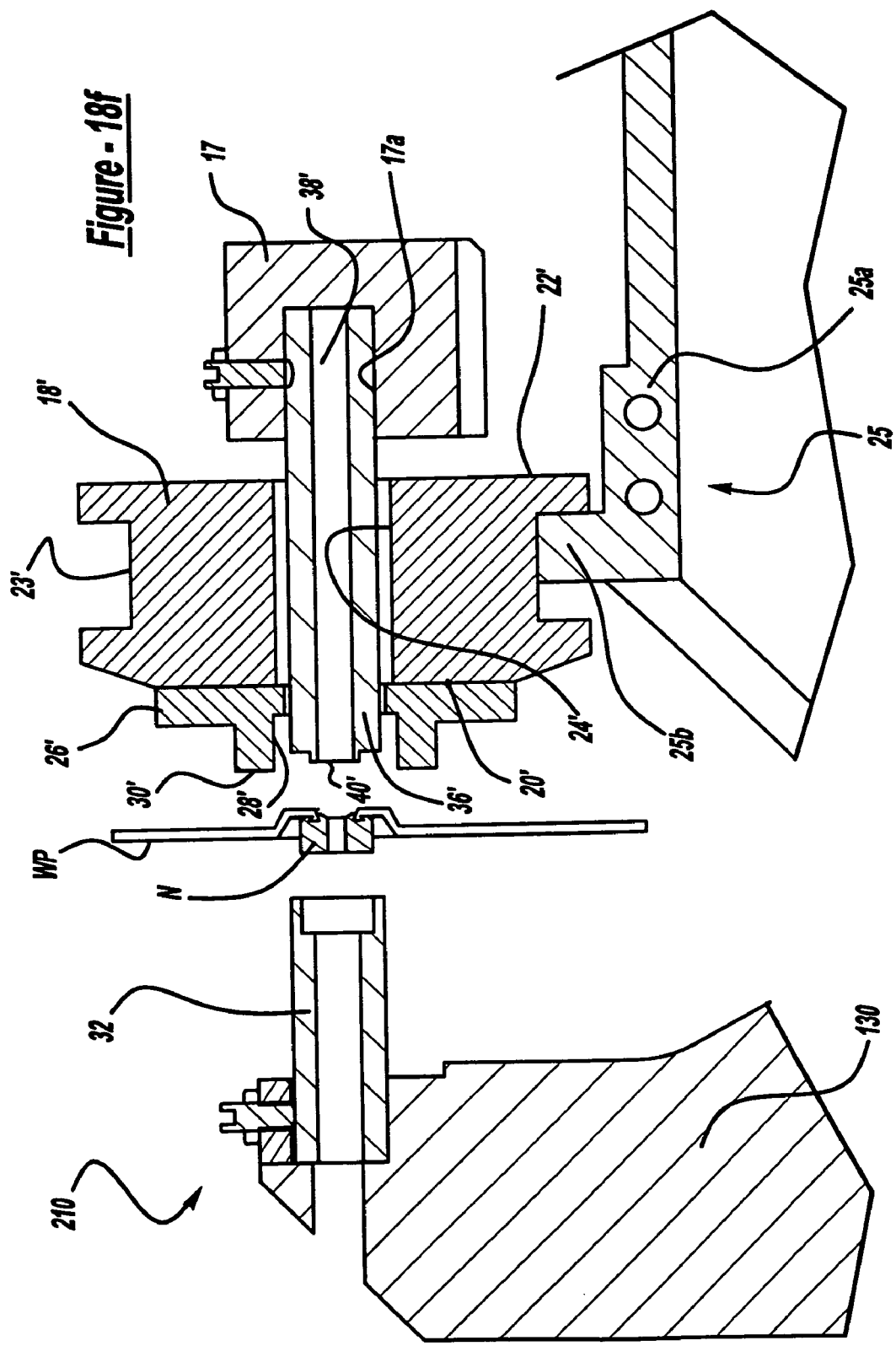
FIG. 18f is a view similar to FIGS. 18a–18e showing a subsequent step in the alternative method of the present invention.

Referring now to FIGS. 18e and 18f, the die block 130 is retracted, and then the programmable robot 11 retracts the entire form and clinch device 210 away from the work piece WP to complete the process.

Referring again to FIG. 14, reciprocation of the slide block 18' is actuated by first and second hydraulic work support devices 42, 42', which may comprise—in part— Hytec Hydraulic Work Support No. 100998 spring advance type work supports, attached to the first and second side plates 14, 16, respectively. U.S. Pat. No. 3,938,798 in the name of Solie et al. provides detailed disclosure pertaining to similar spring advance type work support devices and accordingly is incorporated herein by reference in its entirety.

Figure 20:
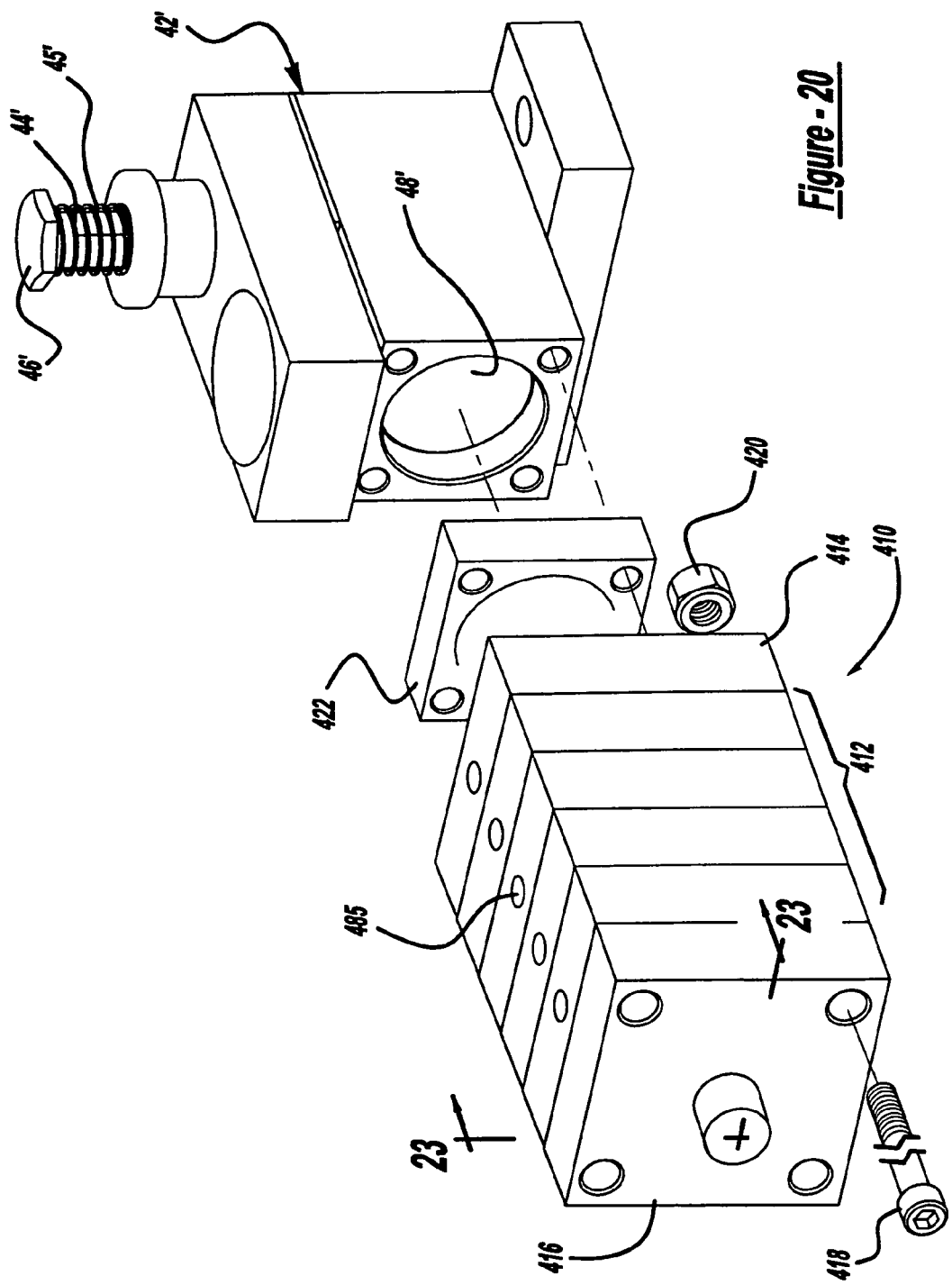
FIG. 20 is an exploded isometric view of a work support and force applying device of the apparatus shown in FIG. 14.

For purposes of clarity, only the composition and operation of the first hydraulic work support device 42 will be disclosed, however it should be appreciated that the preferred embodiment of the form and clinch device 210 includes a second identical hydraulic work support device 42'. As shown in FIG. 20, the hydraulic work support device 42' includes a plunger or piston rod 44' displaceably mounted therein that terminates in a pad 46'. The plunger 44' is normally biased to a fully extended position by an internal spring (not shown) or an external spring 45' as shown. As shown in FIG. 14, the plunger pad 46' of the hydraulic work support device 42' is biased against the rear surface 22' of the slide block 18' to bias the slide block 18' to an advanced position.

Figures 21, 22:
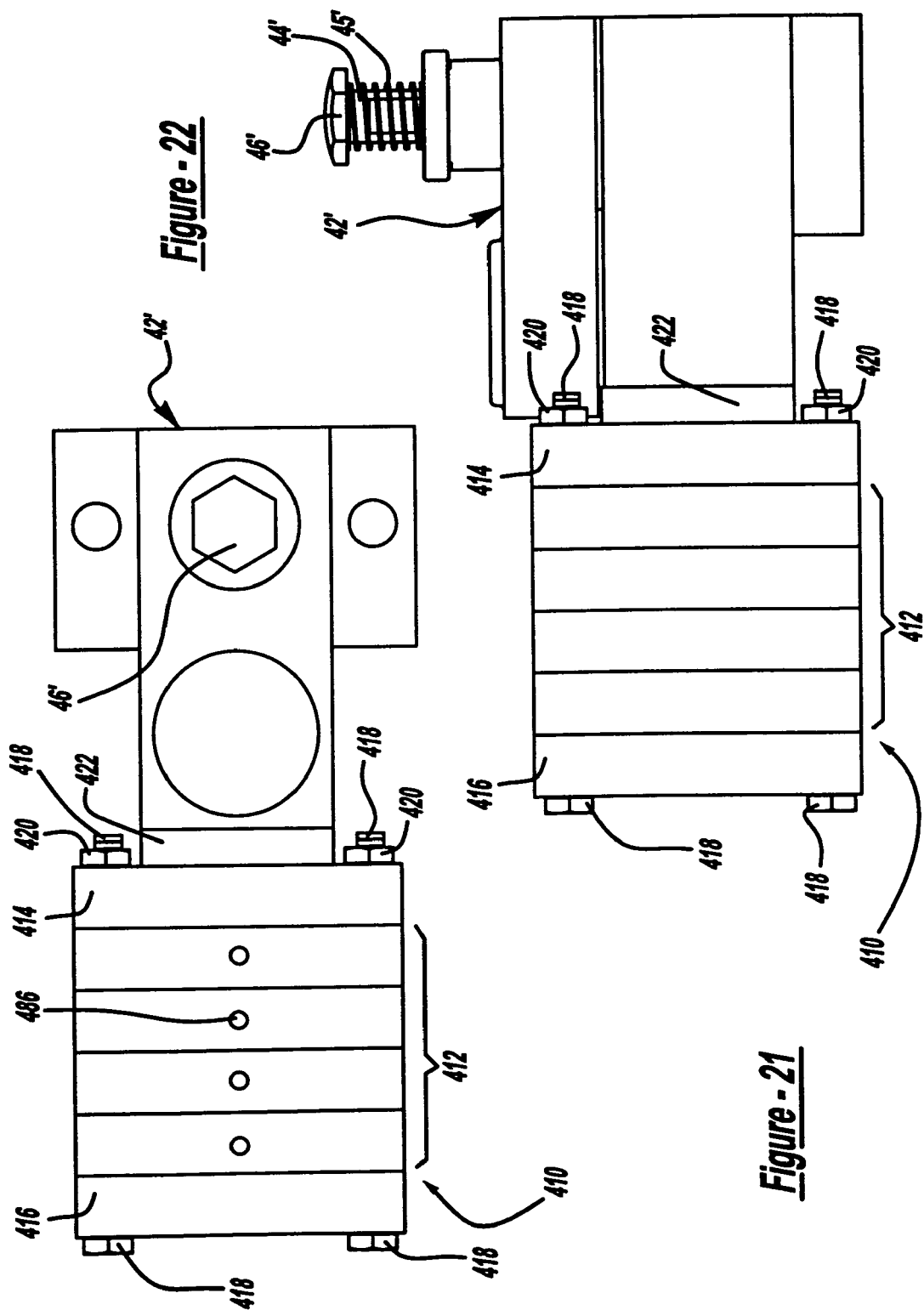

The hydraulic work support device 42' is adapted to lock the plunger 44' in place by contracting an internal sleeve or collet (not shown) to lockingly grip a circumferential portion (not shown) of the plunger 44' in its advanced position. Referring to FIGS. 21 and 22, the preferred embodiment of the present invention includes a force applying device 410 adapted to pneumatically actuate the locking mechanism of the hydraulic work support device 42' such that hydraulic equipment is not required to operate the form and clinch device 210.

Referring again to FIG. 20, the internal sleeve (not shown) of the hydraulic work support device 42 is contracted around a portion of the plunger 44' to lock the plunger 44' by applying force to a movable piston (not shown) within a cylinder 48 of the work support 42. Although the force applied to the movable piston is conventionally applied by hydraulic pressure, it should be appreciated that the work support locking mechanism may be actuated in response to a force applied by an alternate source adapted for such purpose as well. Additionally, it should be appreciated that while such actuation requires only a force of sufficient magnitude to overcome a nominal pre-load, the requisite magnitude for maintaining a work support in the locked condition is proportional to the pre-load in combination with any opposing force externally applied to the plunger 44'. In the past, work supports were almost universally actuated by hydraulic units, which provide high force output. Pneumatic actuation was previously thought to be impractical because only relatively low force output was possible with pneumatic devices.

Again for purposes of clarity, only the composition and operation of the first force applying device 410 will be disclosed as it relates to the hydraulic work support device 42', however it should be appreciated that the form and clinch device 210 includes a second identical force applying device (not shown) configured to actuate the other work support 42. As shown in FIGS. 20–22, the force applying device 410 implements a plurality of self-contained piston assemblies or modules 412 that are adapted to actuate the internal locking mechanism (not shown) of the work support 42, thereby locking the work support plunger 46' in place, and thereafter mechanically resisting an opposing force externally applied to the plunger 46', whereby the force applying device 410 is capable of resisting forces of substantially greater magnitude than heretofore possible with conventional pneumatic devices.

The force applying device 410 generally includes the following subcomponents: a retainer or adapter module 414 for fastening to the work support; the plurality of piston modules 412 for generating a driving force to be applied to the work support; an end-cap retainer module 416 disposed opposite of the adapter module 414 for retaining the plurality of piston modules 412 therebetween; a shaft (not shown) centrally disposed through the modules 412, 414, 416 for supplying fluid to the plurality of piston modules 412; a work support drive member (not shown) for communicating pressure from the plurality of piston modules 412 to the hydraulic work support device 42'; and four tie rods or retainer bolts 418 extending through the modules 412, 414, 416 that are threaded to four retainer nuts 420 for sandwiching the modules 412, 414, 416 together.

Figure 23A:
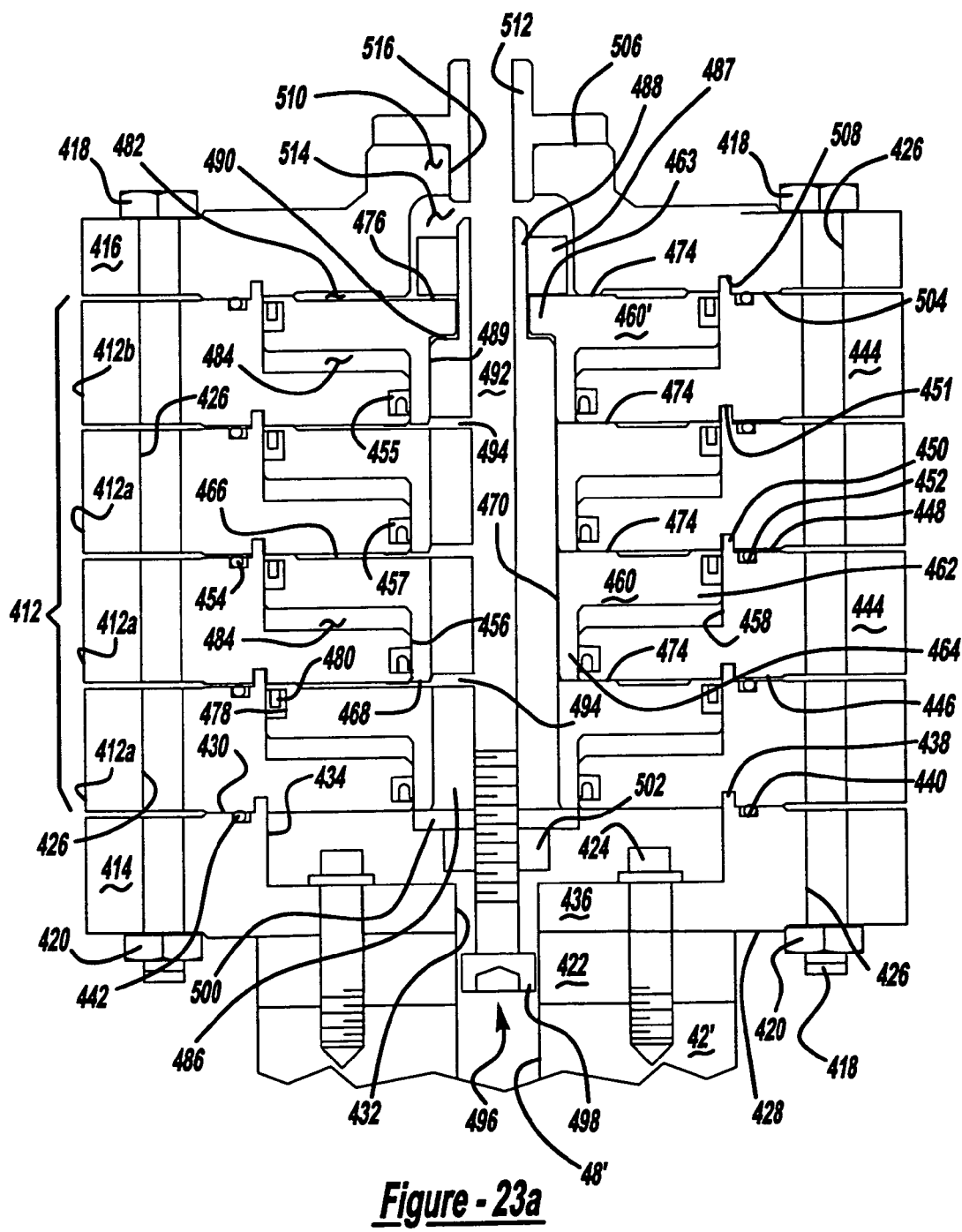
FIG. 23a is a cross-sectional or quarter-sectional view taken along line 23—23 of FIG. 20, showing the force applying device of FIG. 20 in a retracted position.
Figure 23B:
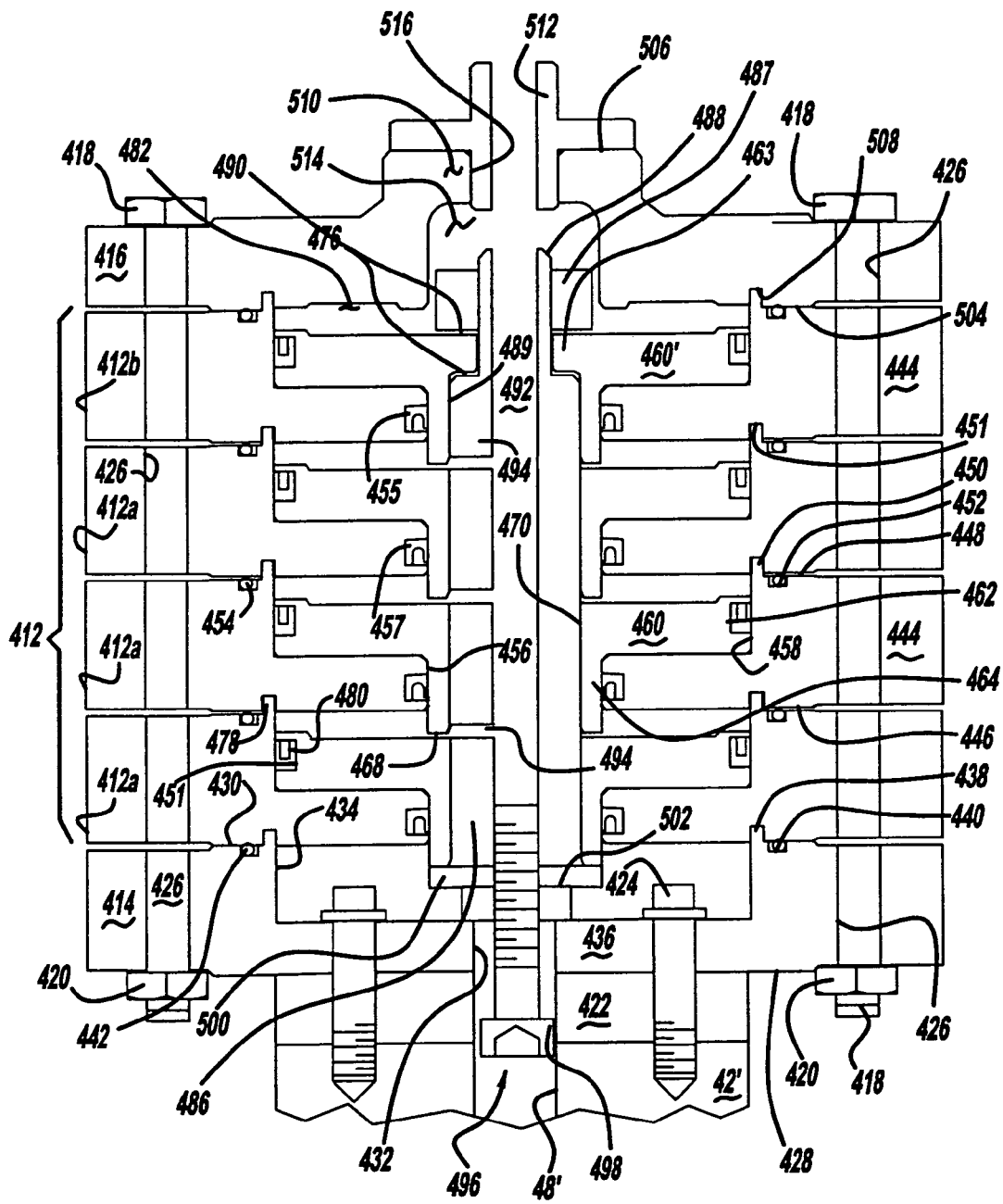
FIG. 23b is a cross-sectional view similar to that of FIG. 23a, showing the force applying device in an advanced position.

Referring now to FIGS. 23*a* and 23*b*, there is shown a force applying device in quarter-section, wherein the crosshatch lines have been omitted for the sake of clarity. The adapter module 414 is fastened to the hydraulic work support device 42', with a spacer block 422 therebetween, by four cap screws 424. The adapter module 414 is preferably rectangular in shape and includes bolt passages 426 therethrough for accepting the retainer bolts 418. The adapter module 414 includes a first surface 428 that mounts flat to the spacer block 422, and includes a second surface 430 disposed opposite of the first surface 428. A throughbore 432 is centrally disposed between the first and second surfaces, and a counterbore 434 is disposed in the second surface to provide relief for the cap screws 424. The throughbore 432 and counterbore 434 define a shoulder 436 for mounting to the hydraulic work support device 42' as shown. An annular tongue or projection 438 extends in a direction axially away from the second surface 430, and an annular seal groove 440 is disposed just diametrically outboard and concentric with respect to the annular projection 438. A seal, such as an O-ring 442, is disposed within the annular seal groove.

The plurality of piston modules 412 include three identical modules 412*a* and one base piston module 412*b*. The identical piston modules 412*a* are stacked in a coaxial, tandem arrangement such that the identical piston modules 412*a* are in direct contact with one another and, in fact, interengage one another. Like the adapter module 414 the identical piston modules 412 are preferably rectangular in shape and include bolt passages 426 therethrough.

The identical piston modules 412 include identical housings 444 in the bolt passages 426 therethrough. Each housing 444 includes a first surface 446 that mounts flat to an adjacent module and seals against the O-ring 454 of an adjacent module. Each housing 444 includes a second surface 448 disposed opposite of the first surface 446. An annular tongue or projection 450 extends in a direction axially away from the second surface 448, and an annular seal groove 452 is disposed just diametrically outboard and concentric with respect to the annular projection 450. O-rings 454 are disposed within the annular seal grooves 452. The first surface 446 includes an annular groove 451 formed therein for acceptance or interengagement with the annular projection 450 of an adjacent module. A void or throughbore 456 is centrally disposed between the first and second surfaces 446 and 448, and a void or counterbore 458 is disposed in the second surface 448. A radial seal groove 457 is formed in the housing 444 within the throughbore 456, and a skirt seal 455 is disposed therein.

Figure 24:
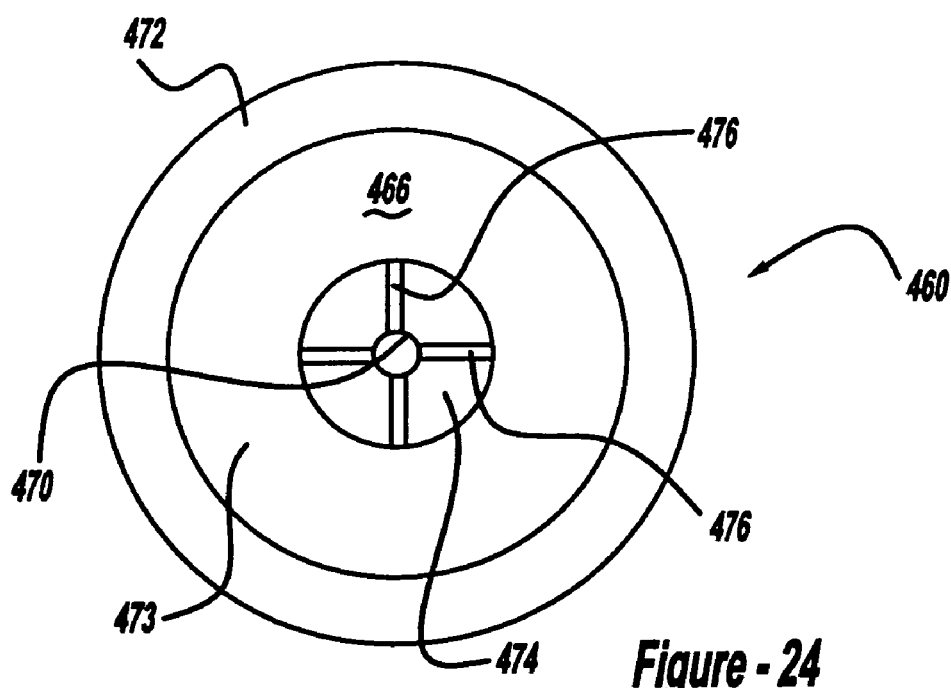

The identical piston modules 412 include work members or pistons 460 which are disposed within the housings 444. Each piston 460 includes a disk portion 462 and a hub portion 464 extending axially away from the disk portion 462. The pistons 460 include driven surfaces 466, oppositely disposed drive surfaces 468, and throughbores 470 extending therebetween. As illustrated in FIG. 24, the driven surfaces 466 include a radially outer ring portion 472 and a radially inner disk portion 474, which includes four radially extending grooves 476 formed therein to communicate fluid to a relieved portion 473 of the pistons 460. Referring again to FIG. 23a, the disk portion 462 includes an annular seal groove 478 in the radial periphery thereof, which houses a wiper or skirt seal 480 therein. The base piston module 412b is nearly identical to the other identical piston modules 412a with the following exception: A work member or piston 460' is disposed within the housing 444 and is identical to the other pistons 460, except that the piston 460' also includes a stepped portion 463 having an internal diameter that is reduced in comparison to the throughbores 470 of the other pistons 460.

Several fluid chambers 482 are defined between the driven surfaces 466 of the pistons 460, 460' and the first surfaces 446, 504 of the various modules. Moreover, exhaust chambers 484 are defined between the housings 444 and the pistons 460, 460'. As will be described in more detail below, fluid pressure is permitted to build up in these fluid chambers 482 so as to advance the pistons 460, 460' from a home position as shown, to an advanced position as shown in FIG. 23b. The piston modules 412 are provided with exhaust ports 485 (shown in FIG. 20), which communicate atmospheric pressure with the various exhaust chambers 484, thereby facilitating the pistons 460, 460' to advance and retract with ease.

The end-cap retainer module 416 is preferably rectangular in shape and is fastened to the adapter module 414 by the four retainer bolts 418 and retainer nuts 420, thereby retaining the piston modules 412 therebetween. The retainer module 416 includes a first surface 504 and oppositely disposed second surface 506. The first surface 504 is provided for sealing against the O-ring 454 of the base piston module 412b and includes an annular groove 508 therein for interengagement with the annular projection 450 of the base piston module 412b. The second surface 506 axially terminates a hub portion 510 that is internally threaded to accommodate the fastening of a standard pipe fitting 512 thereto. A counterbore 514 in the first surface communicates fluid to the fluid chamber 482 behind the base piston 460' and provides clearance for the nut 487 and reduced diameter 488 of the shaft 486 while a throughbore 516 defines an inlet end of the end-cap retainer module 416.

Referring to FIG. 23a, the shaft 486 is centrally and longitudinally disposed through the pistons 460, 460'. The shaft 486 is entrapped within the assembly of piston modules 412 by a nut 487 that threads to a reduced diameter portion 488 at the shaft 486. The shaft 486 includes an outer diameter 489 that, together with the reduced diameter 488, define a shoulder portion 490. The reduced diameter 488 extends through the stepped portion 463 of the base piston module 412b and the shoulder portion 490 axially abuts the stepped portion 463. A throughbore 492 is provided in the shaft 486 to communicate fluid therethrough. A plurality of annular grooves (not shown) are formed in the outer diameter of the shaft 486. Likewise, a plurality of radial holes 494 are formed transverse to the longitudinal axis of the shaft 486, in communication with the annular grooves of the shaft 486, and into communication with the throughbore 492. The annular grooves and radial holes 494 are axially spaced so as to align with the various fluid chambers 482.

The work support drive member 496 includes a cap screw 498 that threads into the end of the shaft 486, a retainer plate 500 that is entrapped between the drive surface 468 of the first of the identical pistons 460, and a nut 502 that threads about the cap screw 498. Accordingly, the nut 502 may be loosened, the cap screw 498 turned, and the nut 502 tightened in order to adjust the length of the work support drive member 496.

First, each piston module 412a–b is assembled separately. The O-rings 454 and skirt seals 455, 480 are placed in their respective annular seal and radial seal grooves 452, and 457, 478 in the housings 444 and in the pistons 460, 460'. Then the pistons 460, 460' are assembled to their respective housings 444. The shaft 486 is then inserted within the first piston 460 and is fastened to the work support drive member 496, thereby entrapping the piston 460 therebetween. The second, third, and fourth piston modules 412 are successively assembled to one another ensuring that the annular projections 450 fit squarely within their respective annular grooves 451. The shaft 486 is then inserted through the second, third, and fourth piston modules 412 such that the reduced diameter 488 of the shaft 486 extends axially beyond the fourth piston module 412a. Simultaneously, the annular projection 450 of the first piston module 412a is squarely inserted into the annular groove 451 of the second piston module 412a. The retainer nut 487 is then threaded onto the reduced diameter 488 of the shaft 486 to complete the piston module subassembly step. Next, the O-ring 442 is assembled to the adapter module 414, which is then fastened to the hydraulic work support device 42' with the spacer block 422 therebetween, using the four cap screws 424. Then, the assembled piston modules 412 are mated with the adapter module 414 such that the annular projection 438 of the adapter module 414 interengages the annular groove 451 of the first piston module 412a and such that the cap screw 498 of the work support drive member 496 extends into the interior of the work support 421. The end cap retainer module 416 is then mated to the assembled piston modules 412 such that the annular projection 450 of the fourth piston module 412b interengages the annular groove 508 of the retainer module 416. Finally, the four retainer bolts 418 are inserted within the bolt passages 426 and the retainer nuts 420 are tightened down on the retainer bolts 418 to complete the assembly.

In operation, fluid pressure is supplied to the force applying device 410 through the standard pipe fitting 512 and into communication with the counterbore 514 of the end cap retainer module 416 and with the throughbore 492 of the shaft 486. The fluid pressure is preferably pneumatic pressure that is supplied and controlled by any of a multitude of means known to those of ordinary skill in the art. Fluid flows through the throughbore 492 of the shaft 486 and out of the radial holes 494 and along the annular grooves of the shaft 486 and into communication with the various fluid chambers 482. Likewise, fluid builds up in the counterbore 514 of the end cap retainer module 416, flows through the radially extending grooves 476 of the piston 460 and into the fluid chamber 482. Accordingly, fluid pressure builds up in the fluid chambers 482 and acts upon the driven surfaces 466 of the pistons 460, 460' to advance the pistons 460, 460' from their position shown in FIG. 23a to their advanced position as shown in FIG. 23b. FIG. 23b also shows the nut 502 of the work support drive member 496 bottomed out on the shoulder 436 of the adapter module 414. The force output of the force applying device 410 is a function of the surface area of the driven surfaces 466 of the pistons 460, 460', and the present invention provides a novel and nonobvious arrangement for capturing a collective force of a plurality of pistons, wherein the pistons are stacked one against the other in series such that the collective force is imparted on a work support drive member 496, rather than merely on a common carrier such as a shaft.

When the pistons 460, 460' are actuated by fluid pressure, they advance such that the various oppositely disposed drive surfaces 468 of the pistons 460, 460' engage or abut the driven surfaces 466 of adjacently disposed pistons 460. Accordingly, the fluid pressure works on each piston individually and works on the pistons 460, 460' collectively by the abutment of the oppositely disposed drive and driven surfaces 466, 468. Thus, the individual and collective force ultimately results in a force being translated to the cap screw 498 of the work support drive member 496 through the retainer plate 500 and nut 502 of the work support drive member 496. The individual and collective forces are capable of displacing the pistons 460, 460' and work support drive member 496, as shown in FIG. 23*b*. When the work support drive member 496 is extended into the cylinder 48' of the hydraulic work support device 42', the resultant force is applied to the movable piston (not shown) of the hydraulic work support device 42', such that the internal sleeve (not shown) of the hydraulic work support device 42' is contracted and the work support plunger 44' is locked. When the force applying device 410 is activated by pneumatic pressure, the force applying device 410 can mechanically resist substantial force applied along its axis of alignment. So, when an external force is applied to the work support plunger 44', such force is translated through the movable piston (not shown) of the hydraulic work support device 42' and to the force applying device 410 along its axis of alignment.

The force applying device 410 of the present invention is superior to prior art force applying devices. First, the force applying device 410 is capable of maintaining the hydraulic work support device 42' in the locked condition under much greater loads than heretofore possible with prior art pneumatic devices of similar size. Second, the piston modules are self-contained, such that a larger separate housing or cylinder is not required to house the pistons. As with prior art devices, a separate cylinder for housing the pistons would necessarily be a component that is relatively long and thereby difficult to machine a precision bore required for the pistons. Accordingly, each piston is contained within its own easier to machine housing. Third, given the self-contained nature of the piston modules, the present invention lends itself to flexibility and modularity. In other words, piston modules can easily be added to the overall force applying device 410 as greater force is required for a given application. For example, if the four piston modules of the present invention are found to apply an inadequate force for a given application, a user could simply unbolt the assembly, insert one or more extra modules between the identical piston modules, replace the bolts and shaft with longer versions, and reassemble. In fact, it may be possible to avoid replacing the shaft, simply by using a longer cap screw 498 in the work support drive member 496 to make up for the shortfall in the length of the shaft. As such, the modules are basically standardized units that are independently operable, such that the pistons may advance and retract within the housings without requiring a separate larger housing or cylinder in which all the pistons are housed.

While the preferred embodiment of the invention has been disclosed, it will be apparent to those skilled in the art that changes may be made to the invention as set forth in the claims and, in some instances, certain features of the invention may be used to advantage without corresponding use of other features. Accordingly, it is intended that the illustrative and descriptive materials herein be used to illustrate the principles of the invention and not to limit the scope thereof. While the form of the embodiment of the invention herein disclosed constitutes a preferred form, it is to be understood that other forms might be adopted as may come within the scope of the claims which follow.

What is claimed is:

1. A programmable apparatus for reforming a body member to establish a surface precisely located at a predefined net reference position and adapted for attaching a component to said surface, said programmable apparatus comprising:
   an anvil;
   programmable means for selective movement of said anvil to said predefined net reference position with respect to said body member;
   means for engaging said body member;
   means for locking and maintaining said means for engaging into engagement with said body member;
   a form ram aligned with said anvil, said form ram having a pad forming die attached thereto, said pad forming die being adapted for mounting said component thereto; and
   drive means for converting rotary motion into translatory motion, said drive means connected to said form ram to effect translation thereof, whereby said translation of said form ram reforms said body member between said pad forming die and said anvil to form said surface precisely located at said predefined net reference position and to clinch said component to said surface.

2. A programmable apparatus according to claim 1 further comprising means for programmably actuating said form ram, said programmable actuating means comprising:
   a reversible servo motor engaged with said drive means for converting rotary motion into translatory motion;
   means for programming stroke length of said drive means for converting rotary motion into translatory motion; and
   means for programming form ram velocity and acceleration to vary over the course of said stroke.

3. A programmable apparatus according to claim 1, wherein said means for locking and maintaining comprises:
   a work support having an internal locking mechanism; and
   means for pneumatically actuating and maintaining said internal locking mechanism of said work support.

4. A programmable apparatus according to claim 3, wherein said means for pneumatically actuating and maintaining comprises:
   a plurality of self-contained piston modules positioned in tandem, at least one of said plurality of self-contained piston modules comprising:
      a housing having a void therein; and
      a piston mounted within said void of said housing, said piston having a driven surface and a drive surface, wherein said piston is adapted to receive fluid pressure against said driven surface to drive said piston in an advanced direction such that said drive surface of said piston abuts another piston of said plurality of self-contained piston modules.

5. A programmable apparatus according to claim 4, further comprising an adapter module having a first surface adapted to be fastened to a work support device and further having a second surface adapted to mount said plurality of self-contained piston modules thereto.

6. A programmable apparatus according to claim 5, further comprising a retainer module positioned opposite said adapter module such that said plurality of self-contained piston modules are positioned between said retainer and adapter modules, said retainer module having a passage therethrough for communicating fluid to said plurality of self-contained piston modules.

7. A programmable apparatus according to claim 4, further comprising a shaft centrally disposed through said piston for communicating fluid to said driven surface of said piston.

8. A programmable apparatus according to claim 7, wherein said shaft includes a throughbore and at least one radial hole in communication with said throughbore for communicating fluid through and out of said shaft to said driven surface of said piston.

9. A programmable apparatus according to claim 8, wherein said shaft further includes a reduced diameter portion.

10. A programmable apparatus according to claim 9, further comprising a nut threaded to said reduced diameter portion of said shaft.

11. A programmable apparatus according to claim 4, wherein said plurality of self-contained piston modules includes at least one housing, said at least one housing comprising:
 a first surface;
 a second surface opposite said first surface;
 said void between said first and second surfaces;
 an annular projection extending axially from said first surface;
 an annular groove in said second surface for accepting another annular projection from another housing of said plurality of self-contained piston modules;
 a second annular groove in at least one of said first and second surfaces for accepting a seal therein.

12. A programmable apparatus according to claim 4, wherein said piston is slidably disposed within said housing in a longitudinal direction such that an exhaust chamber is longitudinally defined between said piston and said housing.

13. A programmable apparatus according to claim 4, wherein said housing includes a first surface and an oppositely disposed second surface, said drive surface of said piston and said first surface of an adjacently disposed housing define a fluid chamber therebetween.

14. A programmable apparatus according to claim 13, wherein fluid pressure accumulates in said fluid chamber so as to slidably displace said piston within said housing from a home position to an advanced position.

15. A programmable apparatus according to claim 1, wherein said anvil comprises a hollow portion and a pad contacting surface, further wherein said pad forming die has a throughbore.

16. A programmable apparatus according to claim 1, wherein said means for engaging said body member comprises:
 a face plate having a passage therethrough and a support surface thereon, said support surface being adapted to engage said body member; and
 means for retractably biasing said face plate in a fully extended position relative to said anvil, whereby engagement with said first body panel is adapted to overcome said fully extended position and retract said support surface of said face plate by an amount necessary to align said pad contacting surface with said predefined net reference position.

17. An apparatus for reforming a body member to establish a surface precisely located at a predefined net reference position and adapted for attaching a component to said surface, said apparatus comprising:
 a fixed anvil having a hollow portion and a pad contacting surface;
 means for programmably moving said fixed anvil, said programmable moving means being adapted to position said fixed anvil at said predefined net reference position;
 a face plate having a support surface adapted to engage said body member, said face plate further having a passage through which said fixed anvil is disposed;
 means for retractably biasing said face plate in a fully extended position relative to said fixed anvil, whereby engagement with said first body panel is adapted to overcome said fully extended position and retract said support surface of said face plate to a retracted position by an amount necessary to position said pad contacting surface at said predefined net reference position;
 means for pneumatically locking and maintaining said face plate in said retracted position such that said support surface remains in contact with said surface of said body member;
 a form ram aligned with said anvil, said form ram having a forming die attached thereto, said forming die having a throughbore, said forming die being adapted for mounting said component thereto; and
 means for programmably translating said form ram to advance said forming die toward said fixed anvil and thereby reform said body member between said forming die and said fixed anvil such that said external surface of the reformed portion of said first member is precisely located at said predefined net reference position.

18. An apparatus according to claim 17, wherein said means for pneumatically locking and maintaining said face plate comprises:
 a work support having an internal locking mechanism; and
 a force applying device adapted to engage and maintain said internal locking mechanism of said work support.

19. An apparatus according to claim 18 wherein said force applying device comprises:
 a plurality of self-contained piston modules being in direct abutment with one another, at least one of said plurality of self-contained piston modules comprising:
  a housing comprising:
   a first surface;
   a second surface opposite said first surface;
   a void between said first and second surfaces;
   an annular projection extending axially from said first surface;
   an annular groove in said second surface for accepting another annular projection from another housing of said plurality of self-contained piston modules; and
   a second annular groove in at least one of said first and second surfaces for accepting a seal therein;
  a piston disposed in said void of said housing, said piston comprising:
   a driven surface; and
   a drive surface substantially opposite said driven surface;
   said drive surface being in direct abutment with another piston of said plurality of self-contained piston modules.

20. An apparatus according to claim 19, further comprising an adapter module having a first surface adapted to be fastened to a work support device and further having a second surface adapted to mount said plurality of self-contained piston modules thereto.

21. An apparatus according to claim 20, further comprising a retainer module positioned opposite said adapter module such that said plurality of self-contained piston modules are positioned between said retainer and adapter modules, said retainer module having a passage therethrough for communicating fluid to said plurality of self-contained piston modules.

22. An apparatus according to claim 19, further comprising a shaft centrally disposed through said piston for communicating fluid to said driven surface of said piston.

23. An apparatus according to claim 22, wherein said shaft includes a throughbore and at least one radial hole in communication with said throughbore for communicating fluid through and out of said shaft to said driven surface of said piston.

24. An apparatus according to claim 23, wherein said shaft further includes a reduced diameter portion.

25. An apparatus according to claim 24, further comprising a nut threaded to said reduced diameter portion of said shaft.

26. An apparatus according to claim 19, wherein said piston is slidably disposed within said housing in a longitudinal direction such that an exhaust chamber is longitudinally defined between said piston and said housing.

27. An apparatus according to claim 19, wherein said drive surface of said piston and said first surface of an adjacently disposed housing defines a fluid chamber therebetween.

28. An apparatus according to claim 27, wherein fluid pressure accumulates in said fluid chamber so as to slidably displace said piston within said housing from a home position to an advanced position.

29. A method of reforming a panel member to establish a surface precisely located at a predefined net reference position and for attaching a component to said surface, said method comprising the steps of:

providing a net locating apparatus having a fixed anvil;

moving said net locating apparatus into engagement with said panel member such that said fixed anvil is aligned with said predefined net reference position;

locating said panel member relative to said predefined net reference position using a locating means;

mechanically locking said locating means in position;

providing a form ram aligned with said anvil, said form ram having a forming die attached thereto, said forming die being adapted for mounting said component thereto; and programmably translating said form ram to advance said forming die toward said fixed anvil and thereby reform said panel member between said forming die and said fixed anvil such that said surface of said panel member is precisely located at said predefined net reference position and such that said component is clinched to said surface.

30. The method according to claim 29 wherein said mechanically locking step comprises the steps of:

mounting a tandem arrangement of a plurality of self-contained piston modules to at least a portion of said locating means; and applying fluid pressure to said tandem arrangement of said plurality of self-contained piston modules to actuate said locating means.

\* \* \* \* \*

UNITED STATES PATENT AND TRADEMARK OFFICE
CERTIFICATE OF CORRECTION

| | |
|---|---|
| PATENT NO. | : 7,100,260 B2 |
| APPLICATION NO. | : 10/641580 |
| DATED | : September 5, 2006 |
| INVENTOR(S) | : Mark A. Savoy and Phillip J. Morgan |

It is certified that error appears in the above-identified patent and that said Letters Patent is hereby corrected as shown below:

In Column 8, Line 7, after "applying" kindly insert --device--.

In Column 10, Line 21, kindly delete "18e" and insert --18f--.

In Column 10, Line 26, kindly delete "20a" and insert --20--.

In Column 10, Line 56, after "pad" kindly insert --P--.

In Column 14, Line 16, after "housing" kindly insert --62--.

In Column 14, Line 17, kindly delete "cylinder 48" and insert --device 42--.

In Column 19, Line 66, before "robot" kindly insert --programmable--.

In Column 20, Line 28, before "is" kindly insert --N--.

In Column 20, Line 29, after "die" kindly insert --32--.

In Column 20, Line 38, kindly delete "SHNJO" and insert --SHINJO--.

In Column 20, Line 54, kindly delete "126'," and insert --32,--.

In Column 20, Line 54, kindly delete "130'." and insert --130.--.

In Column 20, Line 55, kindly delete "130' " and insert --130 --.

In Column 22, Line 25, after "surfaces" kindly insert --428, 430--.

In Column 22, Line 26, after "surface" kindly insert --430--.

In Column 22, Line 34, after "groove" kindly insert --440--.

In Column 22, Line 41, kindly delete "412" and insert --412a--.

In Column 22, Line 43, kindly delete "412" and insert --412a--.

In Column 22, Line 44, kindly delete "in" and insert --with--.

UNITED STATES PATENT AND TRADEMARK OFFICE
CERTIFICATE OF CORRECTION

PATENT NO. : 7,100,260 B2
APPLICATION NO. : 10/641580
DATED : September 5, 2006
INVENTOR(S) : Mark A. Savoy and Phillip J. Morgan It is certified that error appears in the above-identified patent and that said Letters Patent is hereby corrected as shown below:

In Column 22, Line 62, kindly delete "412" and insert --412a--.

In Column 23, Line 50, kindly delete "at" and insert --of--.

In Column 24, Line 14, kindly delete "412" and insert --412a, 412b--.

In Column 24, Line 18, kindly delete "412" and insert --412a, 412b--.

In Column 24, Line 20, kindly delete "412a" and insert --412b--.

In Column 24, Line 34, kindly delete "work support 421" and insert --hydraulic work support device 42'--.

In Column 24, Line 55, kindly delete "460" and insert --460'--.

In Column 25, Line 37, after "modules" kindly insert --412--.

In Column 25, Line 45, after "modules" kindly insert --412--.

In Column 25, Line 49, after "modules" kindly insert --412--.

In Column 28, Line 28, kindly delete "external".

In Column 28, Line 29, before "member" kindly insert --body--.

Signed and Sealed this

Twenty-seventh Day of February, 2007

JON W. DUDAS
*Director of the United States Patent and Trademark Office*